United States Patent
Gu

(10) Patent No.: US 7,953,271 B2
(45) Date of Patent: May 31, 2011

(54) ENHANCED OBJECT RECONSTRUCTION

(75) Inventor: Jin Gu, Ottawa (CA)

(73) Assignee: GestureTek, Inc., Sunnyvale, CA (US)

( * ) Notice: Subject to any disclaimer, the term of this patent is extended or adjusted under 35 U.S.C. 154(b) by 0 days.

(21) Appl. No.: 12/912,447

(22) Filed: Oct. 26, 2010

(65) Prior Publication Data

US 2011/0038530 A1  Feb. 17, 2011

Related U.S. Application Data

(60) Division of application No. 12/145,194, filed on Jun. 24, 2008, now Pat. No. 7,822,267, which is a continuation of application No. 11/327,651, filed on Jan. 9, 2006, now Pat. No. 7,430,312.

(60) Provisional application No. 60/641,752, filed on Jan. 7, 2005.

(51) Int. Cl.
*G06K 9/00* (2006.01)
*G06T 15/00* (2006.01)
*H04N 13/00* (2006.01)

(52) U.S. Cl. ............. 382/154; 345/419; 348/42; 356/12

(58) Field of Classification Search ................... 382/154, 382/285; 345/419–427; 356/12–14; 348/42–60; 359/462–477; 352/57–65; 33/20.4; 353/7–9; 378/41–42; 396/324–331

See application file for complete search history.

(56) References Cited

U.S. PATENT DOCUMENTS

| | | | |
|---|---|---|---|
| 5,435,554 A | 7/1995 | Lipson | |
| 5,808,678 A | 9/1998 | Sakaegi | |
| 5,852,672 A | 12/1998 | Lu | |
| 6,072,496 A | 6/2000 | Guenter et al. | |
| 6,075,905 A | 6/2000 | Herman et al. | |
| 6,195,104 B1 | 2/2001 | Lyons | |
| 6,377,700 B1 | 4/2002 | Mack et al. | |
| 6,414,672 B2 | 7/2002 | Rekimoto et al. | |
| 6,535,114 B1 | 3/2003 | Suzuki et al. | |
| 6,628,819 B1 | 9/2003 | Huang et al. | |
| 6,640,145 B2 | 10/2003 | Hoffberg et al. | |
| 6,683,677 B2 | 1/2004 | Chon et al. | |
| RE38,420 E | 2/2004 | Thomas | |
| 7,015,950 B1 | 3/2006 | Pryor | |
| 7,187,412 B1 | 3/2007 | Silverstein | |

(Continued)

OTHER PUBLICATIONS

Notification of Transmittal of the International Search Report and The Written Opinion of the International Searching Authority, or the Declaration dated Feb. 13, 2007 (10 pages).

(Continued)

*Primary Examiner* — Aaron W Carter
(74) *Attorney, Agent, or Firm* — Fish & Richardson P.C.

(57) ABSTRACT

Processing images includes projecting an infra-red pattern onto a three-dimensional object and producing a first image, a second image, and a third image of the three-dimensional object while the pattern is projected on the three-dimensional object. The first image and the second image include the three-dimensional object and the pattern. The first image and the second image are produced by capturing at a first camera and a second camera, respectively, light filtered through an infra-red filter. The third image includes the three-dimensional object but not the pattern. Processing the images also includes establishing a first-pair correspondence between a portion of pixels in the first image and a portion of pixels in the second image. Processing the images further includes constructing, based on the first-pair correspondence and the third image, a two-dimensional image that depicts a three-dimensional construction of the three-dimensional object.

10 Claims, 22 Drawing Sheets

U.S. PATENT DOCUMENTS

| | | |
|---|---|---|
| 7,379,566 B2 | 5/2008 | Hildreth |
| 2001/0013950 A1 | 8/2001 | Pörnbacher |
| 2002/0153188 A1 | 10/2002 | Brandt et al. |
| 2002/0158815 A1 | 10/2002 | Zwern |
| 2003/0098841 A1 | 5/2003 | Broussard |
| 2004/0102247 A1 | 5/2004 | Smoot et al. |
| 2004/0179728 A1 | 9/2004 | Littlefield et al. |
| 2004/0189720 A1 | 9/2004 | Wilson et al. |
| 2004/0193413 A1 | 9/2004 | Wilson et al. |
| 2004/0228519 A1 | 11/2004 | Littlefield et al. |
| 2004/0246333 A1 | 12/2004 | Steuart |
| 2004/0257452 A1 | 12/2004 | Chang et al. |
| 2005/0110875 A1 | 5/2005 | Ma et al. |
| 2005/0150122 A1 | 7/2005 | Cho et al. |
| 2006/0044289 A1 | 3/2006 | Yee |
| 2006/0103854 A1 | 5/2006 | Franke et al. |
| 2007/0085849 A1 | 4/2007 | Kosolapov |
| 2007/0131850 A1 | 6/2007 | Cofer et al. |
| 2007/0165246 A1 | 7/2007 | Kimmel |

OTHER PUBLICATIONS

Notification of Transmittal of The Interantional Search Report and The Written Opinion of The International Searching Authority, or The Declaration dated Mar. 27, 2007 (15 pages).

Non-Final Office Action issued U.S. Appl. No. 11/932,819, mailed Mar. 31, 2010, 28 pages.

USPTO Non-Final Office Action issued in U.S. Appl. No. 11/337,090, mailed Apr. 29, 2010, 35 pages.

ENHANCED OBJECT RECONSTRUCTION

CROSS-REFERENCE TO RELATED APPLICATION

This application is a divisional of U.S. patent application Ser. No. 12/145,194, filed Jun. 24, 2008, which is a continuation application of U.S. patent application Ser. No. 11/327,651, filed Jan. 9, 2006, now U.S. Pat. No. 7,430,312, which claims the benefit of U.S. Provisional Application No. 60/641,752, filed Jan. 7, 2005, each of which is incorporated herein in its entirety for all purposes.

TECHNICAL FIELD

This disclosure relates to image processing.

BACKGROUND

Industrial products exist in the market for three-dimensional digitization for various purposes. Examples include medical applications, entertainment industry applications (e.g., three-dimensional gaming, filming, and animation), fashion design (e.g., three-dimensional garment design, apparel fitting, and plastic surgery), archaeological restoration and/or preservation, forensic applications (e.g., crime scene investigation), and online commodity exhibition (e.g., online museum and online store).

There are, in general, two categories of three-dimensional digitizing techniques: active sensing and passive sensing. Techniques belonging to the first category, active sensing, usually emit certain energy (e.g., light and/or sound etc.) toward the scene to be measured/observed, and receive the reflected energy or observe the reflected pattern, making use of the physics law in optics or acoustics to derive the distance from the sensor to the object in the scene. Active sensing usually needs a complex and sophisticated optical design of the lighting components, and it usually needs controlled ambient lighting to assist in the three-dimensional capturing. Sensors within this category are usually limited to sensing static scenes/objects because they usually need a certain amount of time to accomplish the scanning procedure due to the normal requirement of physically moving certain components in the scanning systems (e.g., components for emitting lasers within this category need to be moved to scan different lines of the object). Laser scanning, moiré fringe contouring, time of flight, and structured lighting are among the active three-dimensional sensing techniques.

The techniques in the second category of passive sensing, on the contrary, usually do not emit energy toward the scene. Instead, these techniques capture certain signals that are available in the scene, such as intensity and/or color and, by analyzing these signals along with sensor configuration information, these techniques obtain three-dimensional information for the scene. Stereovision (two or more cameras) is a typical example of passive three-dimensional sensing.

Passive sensing usually does not need a complex optical design. For example, a stereovision system usually takes a snapshot of the scene/object and recovers the three-dimensional information with simple devices. Some systems also integrate more cameras in one system to capture both three-dimensional information and color texture information from the scene/object. Systems with sufficiently fast computer CPU time also may handle dynamic scenes. To ensure the stereo cue has sufficient features to match the two views, stereovision-based systems usually need to introduce some additional features onto the scene/object. Projectors (e.g., slide projector or an LCD) are often used to project such patterns onto the surface. In such systems, the pattern is switched on and off in order to capture both (1) the image with the superimposed features and (2) the color texture image of the scene/object without the superimposed features. This generally requires a certain mechanism to turn the pattern on and off. In addition, in situations in which the object of interest is a human being, illuminating patterns onto the face of the human being may cause discomfort to the eyes.

Known stereo systems establish a correspondence between the two stereo views. In general, there are mainly two types of methods for computing the correspondence, or matching. The first method is a feature-based method, which usually generates matches for those positions in the images that have abundant information about the scene, such as corners, edges, and line segments. The second method is an area-based matching technique, which matches the two views based on pixel similarity in local image regions. The feature-based method (the first method) uses surface texture feature information and generates matches for a limited number of pixels. The area-based method (the second method), is typically computationally more expensive, but is typically able to generate dense matches. For three-dimensional digitizing, the higher the resolution at which the three-dimensional surface is sampled, the better the surface is usually captured. The feature-based stereo matching method typically does not provide sufficient matched points for this purpose. The area-based stereo matching method can typically generate sufficient numbers of three-dimensional samples on the surface, however, this method may have a long computation time, especially for high resolution capturing.

SUMMARY

At least one disclosed implementation provides a three-dimensional digitizer system based on a stereovision passive sensing technique. Such a digitizer system is able to capture the scene in real time because it does not involve the physical movement of a component. The digitizer system also uses an infra-red filter to project a pattern onto the scene which enables the system to capture both the measurement image(s) and the texture image(s) simultaneously. These features make this system suitable not only for static objects, but also for three-dimensional reconstruction of dynamic scenes. The simple and straightforward principles of this system do not require complicated mechanical or electrical design or special installation. This system works in a normal office environment, requiring no controlled ambient lighting, and is therefore easy to port and to use. This system may also use a reference stripe as the pattern in stereovision, and may use a described matching propagation technique to assist in finding a correspondence between the views efficiently and accurately. The system also may perform filtering and smoothing using a Kalman filter and Non-Uniform Rational B-Spline surface fitting to attempt to effectively deal with the noise from sensors and numerical calculation.

According to a general aspect, processing images includes projecting an infra-red pattern onto a three-dimensional object. Processing the images also includes producing a first image, a second image, and a third image of the three-dimensional object while the pattern is projected on the three-dimensional object. The first image includes the three-dimensional object and the pattern, and it is a two-dimensional digital image including pixels. The first image is produced by capturing at a first camera light filtered through an infra-red filter. The second image includes the three-dimensional object and the pattern, and it is a two-dimensional digital image including pixels. The second image is produced by capturing at a second camera light filtered through an infra-red filter. The first and second cameras are arranged as a first stereo pair having a known physical relationship. The third image includes the three-dimensional object but not the pattern, and it is a two-dimensional digital image including pixels. Processing the images also includes establishing a first-pair correspondence between a portion of the pixels of the first image and a portion of the pixels in the second image. Processing the images further includes constructing, based on the first-pair correspondence and the third image, a two-dimensional image that depicts a three-dimensional construction of the three-dimensional object.

Implementations of the above general aspect may include one or more of the following features. For example, projecting the infra-red pattern may include projecting a non-random infra-red pattern. The pattern may include vertical stripes. The light may be non-infrared light. The third image may be produced by capturing non-filtered light at a third camera. The third camera may be a texture camera.

Establishing the first-pair correspondence may include determining a correspondence between an initial pixel in the first image and a corresponding pixel in the second image. Establishing the first-pair correspondence may also include determining a correspondence between additional pixels in the first image and corresponding pixels in the second image, based on the correspondence between the initial pixel in the first image and its corresponding pixel in the second image.

Establishing the first-pair correspondence may include determining a correspondence between a first initial pixel located on a first particular horizontal line in the first image and a first corresponding pixel that corresponds to the first initial pixel. The first corresponding pixel may be located on the first particular horizontal line in the second image. Establishing the first-pair correspondence may also include determining a correspondence between additional pixels located on the first particular horizontal line in the first image and corresponding pixels that correspond to the additional pixels. The corresponding pixels may be located on the first particular horizontal line in the second image. Establishing the first-pair correspondence may also include determining a correspondence between a second initial pixel located on a second particular horizontal line in the first image and a second corresponding pixel that corresponds to the second initial pixel. The second corresponding pixel may be located on the second particular horizontal line in the second image. Establishing the first-pair correspondence may also include determining a correspondence between additional pixels located on the second particular horizontal line in the first image and corresponding pixels that correspond to the additional pixels. The corresponding pixels may be located on the second particular horizontal in the second image.

Establishing the first-pair correspondence may include determining a correspondence between an initial pixel in each horizontal line in the first image and a corresponding pixel in each horizontal line in the second image. Correspondence between additional pixels in the first image and corresponding pixels in the second image may be determined based on the correspondence between the initial pixel in each horizontal line in the first image and its corresponding pixel in each horizontal line in the second image. The first initial pixel may be a centroid pattern pixel calculated from the pattern pixels in the first particular horizontal line.

Determining the correspondence for at least one of the additional pixels located on the second particular horizontal line in the first image may be based on the correspondence determined for at least one other pixel located in the second particular horizontal line.

Determining the correspondence for at least one of the additional pixels located on the second particular horizontal line in the first image may be based on the correspondence determined for at least one pixel located in the first particular horizontal line. The at least one pixel located in the first particular horizontal line may be in a common stripe edge with the at least one of the additional pixels located in the second particular horizontal line.

Constructing the two-dimensional image that depicts the three-dimensional construction may include forming a first set of three-dimensional points based on the first-pair correspondence and producing a first three-dimensional surface model based on the first set of three-dimensional points.

A fourth image of the three-dimensional object may be produced while the pattern is projected on the three-dimensional object. The fourth image may be a two-dimensional digital image including pixels and may be produced by capturing at a fourth camera light filtered through an infra-red filter.

A fifth image of the three-dimensional object may be produced while the pattern is projected on the three-dimensional object. The fifth image may be a two-dimensional digital image including pixels and may be produced by capturing at a fifth camera light filtered through an infra-red filter. The fourth and fifth cameras may be arranged as a second stereo pair having a known physical relationship. A second-pair correspondence may be established between a portion of the pixels of the fourth image and a portion of the pixels of the fifth image. Constructing the two-dimensional image that depicts the three-dimensional construction of the three-dimensional object may further be based on the second-pair correspondence.

Constructing the two-dimensional image that depicts the three-dimensional image may include producing a first three-dimensional surface model based on the first-pair correspondence, producing a second three-dimensional surface model based on the second-pair correspondence, and registering the first and the second three-dimensional surface models. Registering the first and the second three-dimensional surface models may include determining a common surface in the first and the second three-dimensional surface models. The common surface may be used to produce an initial estimate for a registration matrix. The initial estimate for the registration matrix may be used to determine the closest points between the first and the second three-dimensional surface models.

Producing the first three-dimensional surface model may include forming a first set of three-dimensional points based on the first-pair correspondence and producing the first three-dimensional surface model based on the first set of three-dimensional points. Producing the second three-dimensional surface model may include forming a second set of three-dimensional points based on the second-pair correspondence and producing the second three-dimensional surface model based on the second set of three-dimensional points.

The first and second three-dimensional surface models may be integrated after registration to produce an integrated three-dimensional surface model. Texture may be provided to the integrated three-dimensional surface model.

According to another general aspect, a system for processing images includes a first stereo camera pair including a first camera coupled to a second camera and a second stereo camera pair including a third camera coupled to a fourth camera. The system also includes a set of four infra-red filters, with a separate one of the four infra-red filters operatively coupled to each of four cameras and a projector. The system further includes a computer readable medium coupled to each of the four cameras and to the projector. The computer readable medium includes instructions for projecting an infra-red pattern from the projector onto a three-dimensional object. The computer reasonable medium also includes instructions for producing a first image, a second image, and a third image of the three-dimensional object while the pattern is projected on the three-dimensional object. The first image includes the three-dimensional object and the pattern, and it is a two-dimensional digital image including pixels. The first image is produced by capturing at a first camera light filtered through an infra-red filter. The second image includes the three-dimensional object and the pattern and it is a two-dimensional digital image including pixels. The second image is produced by capturing at a second camera light filtered through an infra-red filter. The first and second cameras are arranged as a first stereo pair having a known physical relationship. The third image includes the three-dimensional object but not the pattern and it is a two-dimensional digital image including pixels. The third image is produced by capturing light at a texture camera. The computer readable medium also includes instruction for establishing a first-pair correspondence between a portion of the pixels of the first image and a portion of the pixels of the second image. The computer readable medium further includes constructing, based on the first-pair correspondence and the third image, a two-dimensional image that depicts a three-dimensional construction of the three-dimensional object.

Implementations of the above general aspect may include one or more of the following features. For example, the projector may include a lighting source capable of producing light in the visible spectrum and in the infrared spectrum. The projector may include a fifth infra-red filter. The computer readable medium may include one or more of a processing device and a storage device.

According to another general aspect, a computer readable medium includes instructions for accessing a first image, a second image, and a third image captured of a three-dimensional object. The first image is captured while a pattern is projected on the three-dimensional object, and it includes the three-dimensional object and the pattern. The first image is a two-dimensional digital image including pixels. The first image is produced by capturing at a first camera light filtered through an infra-red filter. The second image is captured while the pattern is projected on the three-dimensional object, and it includes the three-dimensional object and the pattern. The second image is a two-dimensional digital image including pixels, and it is produced by capturing at a second camera light filtered through an infra-red filter. The third image is captured while the pattern is projected on the three-dimensional object, and it includes the three-dimensional object but not the pattern. The third image is a two-dimensional digital image including pixels. The computer readable medium also includes instructions for establishing a first-pair correspondence between a portion of the pixels of the first image and a portion of the pixels of the second image. The first-pair correspondence is established based on the first and second cameras having been arranged as a first stereo pair having a known physical relationship while the first and second images were captured. The computer readable medium also includes instructions for constructing, based on the first-pair correspondence and the third image, a two-dimensional image that depicts a three-dimensional construction of the three-dimensional object.

The various aspects, implementations, and features may be implemented using, for example, one or more of a method, an apparatus, an apparatus for performing a method, a program or other set of instructions, an apparatus that includes a program or other set of instructions, or a computer readable medium. The computer readable medium may include, for example, instructions, software, images, and other data.

The details of one or more implementations are set forth in the accompanying drawings and the description below. Other features will be apparent from the description and drawings, and from the claims.

DESCRIPTION OF DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
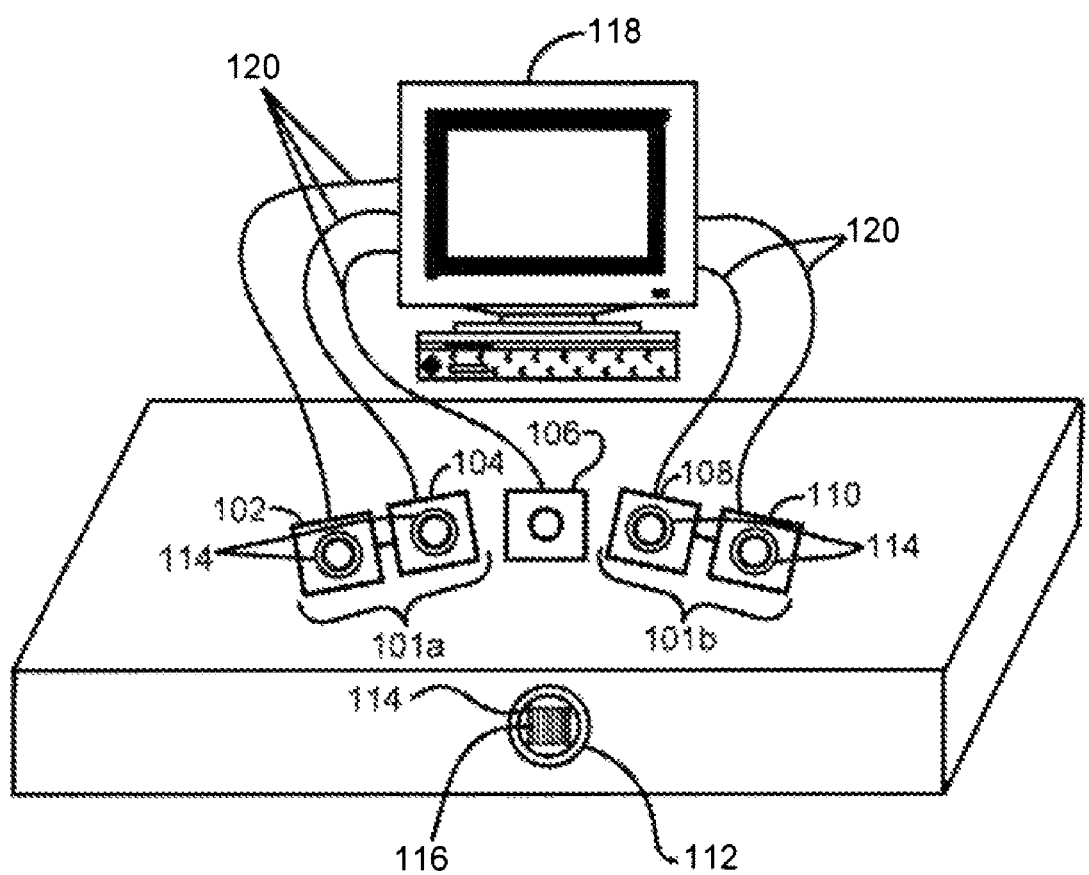
FIG. 1 illustrates a three-dimensional digitizing system.

Referring to FIG. 1, an implementation for a three-dimensional digitizing system 100 is shown, which includes five cameras 102, 104, 106, 108, and 110. The cameras are arranged as two stereo pairs 101a and 101b, with stereo pair 101a including cameras 102 and 104, stereo pair 101b including cameras 108 and 110, and as one texture camera 106. System 100 also includes a pattern projector 112, five infrared filters 114 (one on each of stereo cameras 102, 104, 108, and 110 and one on pattern projector 112), and a slide 116 having a pattern. As an illustrative example, slide 116 is shown with a vertical-line pattern. Cameras 102, 104, 106, 108, and 110 are coupled to a computer processor 118 via wires 120.

The three-dimensional digitizing system 100 is able to capture three-dimensional information of a dynamic or a static scene. System 100 uses infrared lighting to illuminate an object and uses infrared filters 114. System 100 illuminates the object with a desired pattern using projector 112, filter 114, and slide 116 containing the desired pattern. Projector 112 may include a normal light source capable of producing light in the visible spectrum and in the infrared spectrum. The normal light is filtered so that predominately only infrared light is projected. In another implementation, the projector may include infrared light source without filter 114. System 100 captures the superimposed pattern using stereo cameras 102, 104, 108, and 110, which are each equipped with one of infrared filters 114. Also, system 100 is able to simultaneously capture the color texture of the object using texture camera 106. Because camera 106 does not include one of the infrared filters 114, camera 106 will receive all incoming light, including visible light and infrared light. However, the visible light is typically much stronger than the infrared light and, accordingly, camera 106 does not visibly show the infrared pattern on the captured image. System 100 transmits this information to computer processor 118 via wires 120. Computer processor 118 may employ a process 200, described below, that uses this information to create a single three-dimensional surface with texture. The use of infrared lighting and infrared filters provides an implementation that does not have a visible illumination on the object being photographed. If the object is a face of a lone human, the lack of the visible illumination may be advantageous because the pattern will not distract the human. In addition, the use of infrared lighting and infrared filters permits all of the images to be taken simultaneously (depending on the speed, for example, of the fire-wire card or USB interface), because the pattern need not be switched on and off. Further, because the pattern need not be switched on and off, the images can be taken without requiring additional control of the hardware, except for controlling the cameras to capture images.

Figure 2:
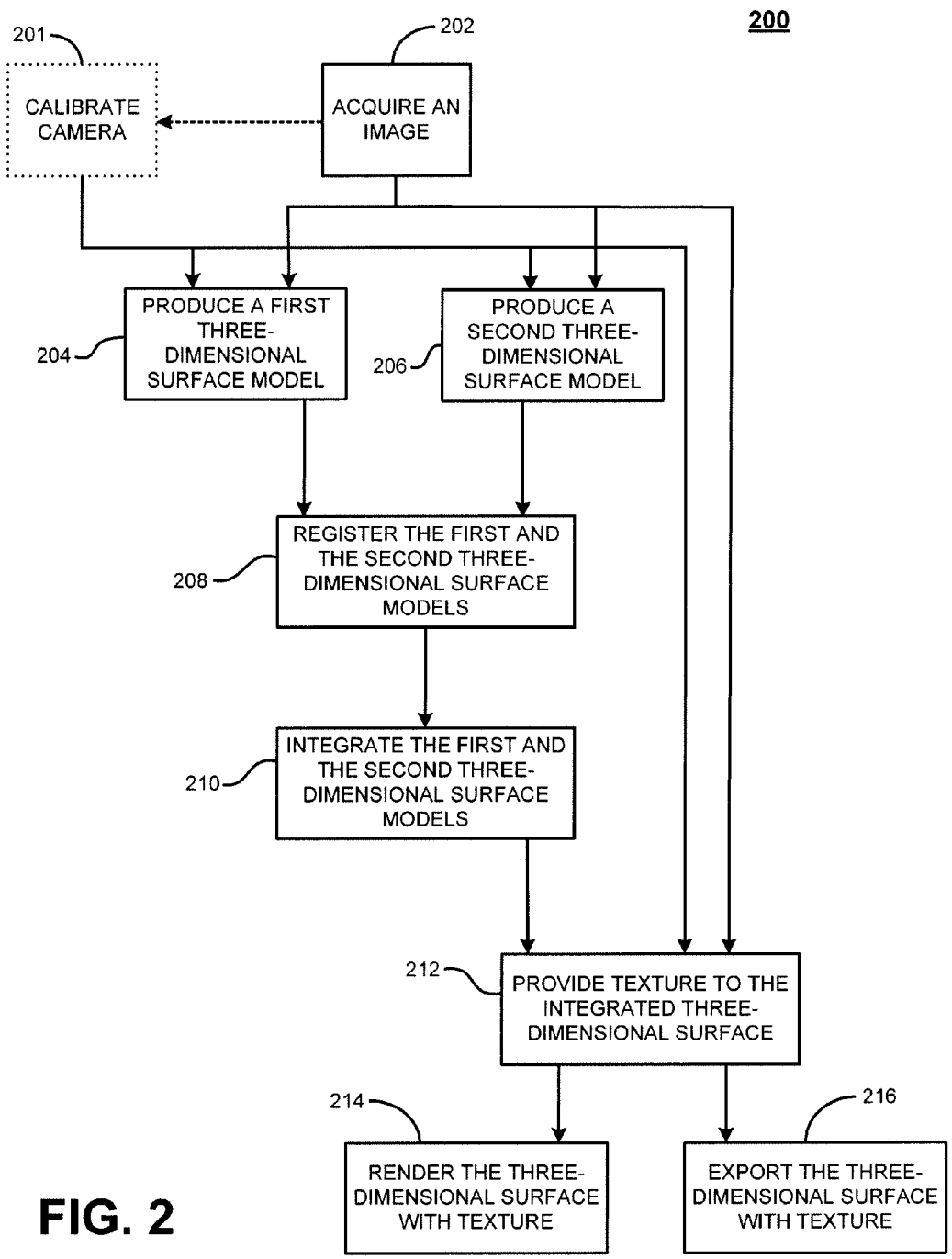
FIG. 2 illustrates a process using the three-dimensional digitizing system of FIG. 1.

Referring to FIG. 2, process 200 may use system 100, for example, to perform three-dimensional reconstruction of an object. Process 200 includes acquiring an image (202). In one implementation that uses system 100, as part of acquiring the image (202), a first stereo image, a second stereo image, and a texture image are produced while the pattern is projected on the three-dimensional object. The first stereo image is produced by the stereo pair 101a and includes a first image and a second image of the three-dimensional object. The first image is produced by capturing, at camera 102, light filtered through infrared filter 114. The second image is produced by capturing, at camera 104, light filtered through infrared filter 114. The first image includes the three-dimensional object with the pattern and may be a two-dimensional digital image including pixels. Similarly, the second image includes the three-dimensional object with the pattern and is a two-dimensional digital image including pixels. The second stereo image is produced by the stereo pair 101b and includes a third image and a fourth image of the three-dimensional object. The third image is produced by capturing, at camera 108, light filtered through infrared filter 114 and is a two-dimensional digital image including pixels. Similarly, the fourth image is produced by capturing, at camera 110, light filtered through infrared filter 114 and is a two-dimensional digital image including pixels.

In the above implementation, the texture image of the three-dimensional object is produced by capturing non-filtered light at texture camera 106. The texture image includes the three dimensional object, without revealing the infrared pattern, and is a two-dimensional digital image including pixels.

Process 200 includes, optionally (as indicated by the dashed line around operation 201), calibrating one or more, or all of the cameras 102, 104, 106, 108, and 110 (201). As part of the calibration (201), one or more, typically multiple, camera parameters may be determined and modified, such as, for example, extrinsic and intrinsic parameters. Extrinsic parameters include translation and rotation of the cameras with respect to a reference coordinate system. Intrinsic parameters include camera focal lengths, the image center, and lens distortion parameters. The calibration in this implementation is done during system setup, and both intrinsic and extrinsic parameters are stored and later used in the three-dimensional reconstruction process. System 100 may need to be re-calibrated if one of cameras 102, 104, 106, 108, and 110 is moved with respect to the other cameras. Calibration typically involves human input, although it need not necessarily require human input. Other operations, particularly subsequent operations, in process 200 typically work automatically without human input.

Process 200 includes producing a first three-dimensional surface model (also referred to as a first mesh) (204). Producing the first three-dimensional surface model (204) may use one or more of the camera parameters and the first stereo image. The camera parameters may be used to rectify the first stereo image according to well-known techniques in the art. As part of rectification in one implementation, the extrinsic and intrinsic parameters are used to compute a 3×3 rectification matrix for each image captured in the stereo pair 101a. The rectification matrices transform the two images of the stereo pair 101a such that the corresponding pixels in each image have the same horizontal position. The first stereo image is used to establish a first-pair correspondence between pixels of the first image and pixels of the second image. The first-pair correspondence is used to establish a first set of three-dimensional points, which is in turn used to produce the first three-dimensional surface model (204).

Similarly, process 200 includes producing a second three-dimensional surface model (also referred to as a second mesh) (206). Producing the second three-dimensional surface model may use one or more of the camera parameters and the second stereo image. The camera parameters may be used to rectify the second stereo image according to well-known techniques in the art. As described above in one implementation, the extrinsic and intrinsic parameters are used to compute a 3×3 rectification matrix for each image captured in the stereo pair 101b. The rectification matrices transform the two images captured in the stereo pair 101b such that the corresponding pixels in each image have the same horizontal position. The second stereo image is used to establish a second-pair correspondence between pixels of the third image and pixels of the fourth image. The second-pair correspondence is used to produce a second set of three-dimensional points, which is in turn used to produce the second three-dimensional surface model (206).

As part of producing the first and the second three-dimensional surface models (204 and 206), a stereo matching method may be used. One particular stereo matching method includes projecting a predefined pattern consisting of a set of stripes onto the three-dimensional object. The predefined pattern provides sufficient information to establish the first-pair correspondence between stripe pixels of the first image and the stripe pixels of the second image. Similarly, the predefined pattern provides sufficient information to establish the second-pair correspondence between stripe pixels of the third image and the stripe pixels of the fourth image. The resolution of the reconstructed three-dimensional image of the object depends on the resolution of the stripes because the stripes are used to compute the three-dimensional surface of the object. Thus, if more stripes are used as part of projected pattern, more three-dimensional points on the surface are sampled and more surface detail is captured. It is possible to choose the proper pattern according to the complexity of the object to be digitized. For example, a surface with less detail (e.g. a football) needs fewer stripes than a surface with more detail (e.g., a human face).

In one implementation, the stereo matching includes a disparity propagation approach. The disparity propagation approach includes locating initial matched pixels, also referred to as seeds, in two images of each of the stereo pairs 101*a* and 101*b*. To locate the initial matched pixels, a reference stripe may be used to provide an anchoring position. The occurrence of the reference stripe in each of the two images may be taken as the first matched pair of stripes. In one such implementation shown in FIGS. 3A-3B, a reference stripe 308 is wider than other stripes 306. In another implementation, the reference stripe 308 may have the same width as the other stripes 306.

After locating the initial matched pixels, the disparity propagation approach propagates the initial matched pixels in one or more directions, as described below in more detail with respect to FIGS. 11-13. As part of propagating the initial matched pixels, consideration is given to the possibility that one or more depth discontinuities may occur. A first image 302, a second image 304, a third image 312, and a fourth image 314, each includes a depth discontinuity 310 between chin/neck surfaces of the object (e.g., the face of FIG. 3A). The depth discontinuity occurs at the junction of two (or more) physical surfaces having different depths. The depth discontinuity presents a difficulty in propagating the initial matched pixels in the two images because the depth discontinuity deforms the stripes, which are used in the disparity propagation approach to match the two images. For example, the depth discontinuity may cause the same physical stripe to be shown as several broken segments in the chin/neck area, neck/clothing area, and/or nose area of the object (e.g., the face of FIG. 3A), as further discussed below with respect to FIG. 4. Furthermore, the depth discontinuity may cause two stripes to join each other and form a single stripe, as further discussed below with respect to FIG. 5.

Figure 3A:
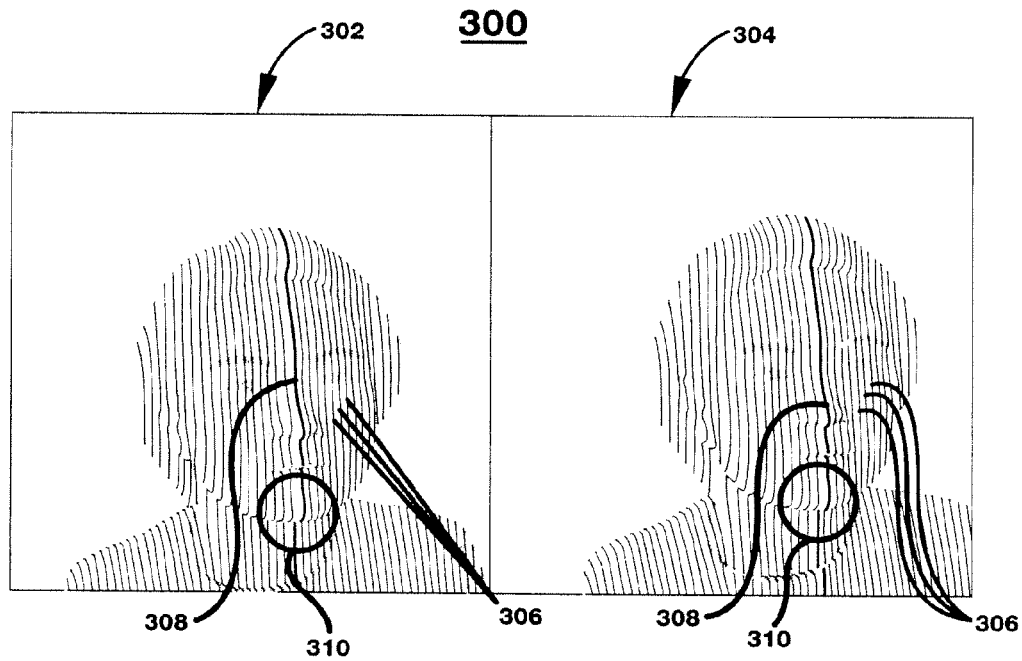
FIG. 3A illustrates a first image and a second image including patterns captured in a first stereo pair.
Figure 4:
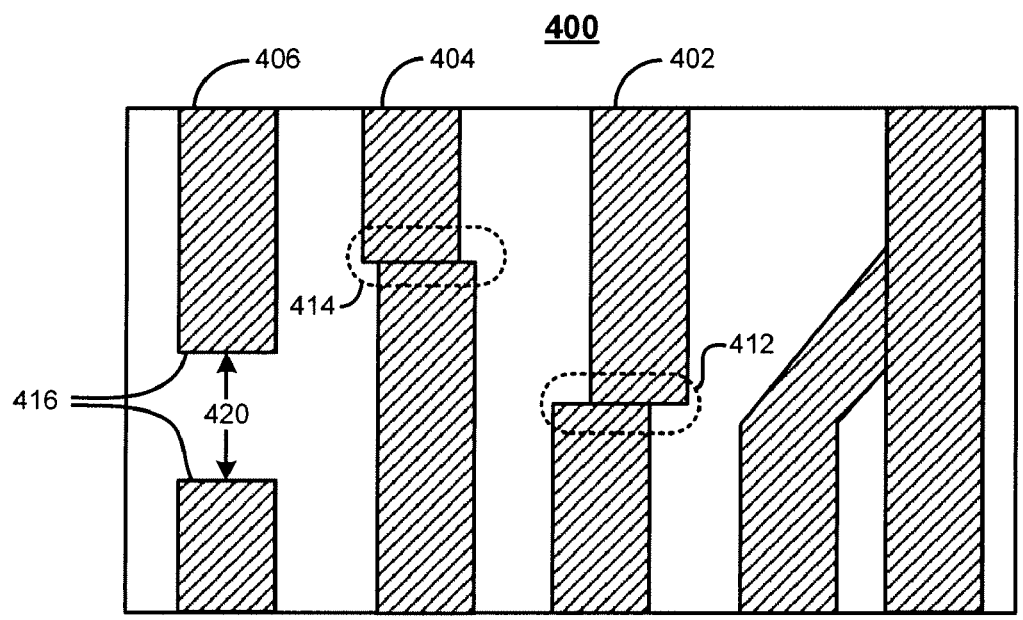
FIG. 4 illustrates a first striped pattern imposed on one of the images of FIGS. 3A-3B.

FIG. 4 illustrates an example of a striped pattern 400 projected onto one of the images 302, 304, 312, and 314 without the image being shown. As illustrated, the depth discontinuity deforms the striped pattern 400, which includes stripes 402, 404, and 406. For example, stripe 402 breaks at a region 412 corresponding to a chin/neck area of the object (e.g., the face of FIG. 3A) over which the pattern is projected. Similarly, stripe 404 breaks in a region 414 corresponding to a nose of the object (e.g., the face of FIG. 3A) over which the pattern is projected. Stripe 406 includes stripe ends 416, which are adjacent to an area 420. The area 420 corresponds to a space between a jaw and a shoulder of the object (e.g., the face of FIG. 3A) over which the pattern is projected. In one implementation, the disparity propagation approach takes into account the depth discontinuities noted above. For example, the disparity propagation approach does not propagate the initial matched pixels across stripe ends 416 because the disparity propagation approach has marked stripe ends 416 such that the stripe ends 416 stop the propagation, as described below in more detail with respect to FIGS. 7A-7C.

Figure 5:
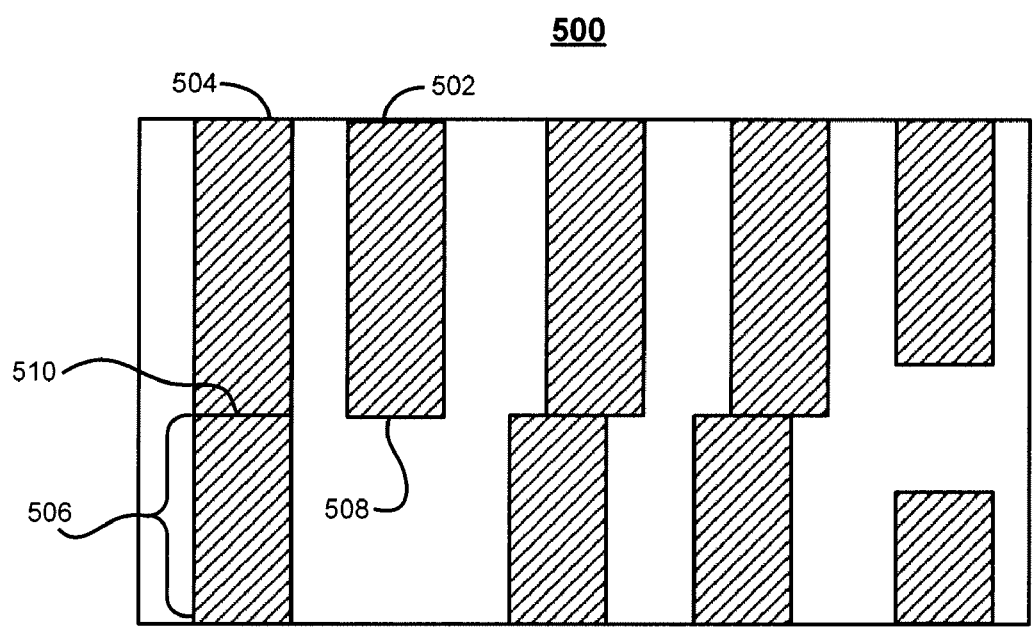
FIG. 5 illustrates a second striped pattern imposed on one of the images of FIGS. 3A-3B.

As noted above, the depth discontinuity may also cause two stripe segments to join each other. FIG. 5 illustrates an example of a striped pattern 500 captured in one of the stereo cameras 102, 104, 108, and 110. Again, as with FIG. 4, the striped pattern 500 has been projected onto an image, and the image is removed to show the pattern 500 in isolation. The striped pattern 500 includes stripes 502 and 504. Stripe 502 includes a stripe end 508. Stripe 502 breaks at the stripe end 508 due to depth discontinuity and the lower segment of stripe 502 shifts to a lower segment 506 of stripe 504. If the initial matched pixels are simply propagated along stripe 504 there is a high possibility of introducing wrong matches. This is because as part of disparity propagation, described in more detail below with respect to FIGS. 11-13, a small window (e.g., ±3 pixels) is used to find the best disparity for the initial matched pixels. The disparity means the difference between column positions of the initial matched pixels. The best disparity results when the difference between the column positions of the initial matched pixels is a minimum. However, when the depth discontinuity causes two stripe segments join each other, the best disparity may fall outside the search window. Thus, if the initial matched pixels are propagated along the stripe with the depth discontinuity (e.g., along the segment 506), incorrect matches are produced. One implementation of the disparity propagation approach includes several techniques for addressing this problem, as described below in more detail with respect to FIG. 13.

As noted above, an implementation of the disparity propagation approach includes locating the initial matched pixels. There are several methods for locating the initial matched pixels, depending on the type of pattern used. In one implementation, a special reference stripe is used to locate the initial matched pixels. In this implementation shown in FIGS. 3A-3B, the projected pattern includes the reference stripe 308, which is wider than the other stripes 306 such that the reference stripe 308 is unique in the image. Thus, locating the initial matched pixels is accomplished by locating the position of the reference stripe 308 in the two images.

Figure 6:
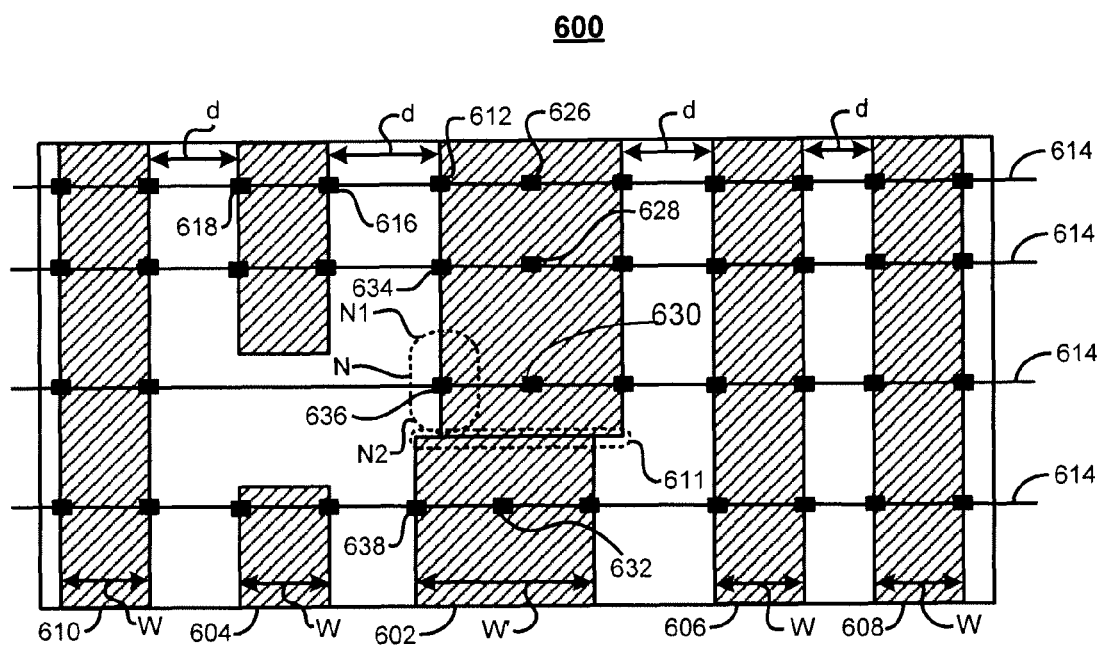
FIG. 6 illustrates a grid that includes a set of vertical stripes and horizontal lines.

FIG. 6 illustrates a grid 600 that includes horizontal lines 614, also referred to as raster lines, and stripes 602, 604, 606, 608, and 610. Stripes 602, 604, 606, 608, and 610 are the striped pattern imposed on an object (e.g., the face of FIG. 3A). Stripe 602, also referred to as a reference stripe, is different from stripes 604, 606, 608, and 610. The reference stripe 602 is located in the center of the projected pattern and has a width w'. The width w' of the reference stripe 602 is approximately twice the width w of stripes 604, 606, 608, and 610. Stripes 602, 604, 606, 608, and 610 are located within a distance d from each other. In one implementation the distance d is equal to the width w. In another implementation, the distance d may be larger or smaller than the width w.

Stripes 602, 604, 606, 608, and 610 may break at different locations due to depth discontinuities. For example, the reference stripe 602 breaks at a region 611 that may correspond to a chin/neck area of the object (e.g., the face of FIG. 3A). The reference stripe 602 may also break at a neck/clothing region of the object (e.g., the face of FIG. 3A). Furthermore, the depth discontinuity may cause segments of the reference stripe 602 to join segments of another projected stripe and form a single stripe in the image. As such, depth discontinuities may make it difficult to recover a complete reference stripe in images 302, 304, 312, and 314. However, observation shows that the "wider" property holds everywhere along the reference stripe 602. Therefore, this characteristic may be utilized in locating segments of the reference stripe 602.

Shadow and occlusion normally create wide stripes in the image, which may appear like a reference stripe. Thus, shadow and occlusion interfere with locating the reference stripe 602. The disparity propagation approach excludes the stripes created by shadow and occlusion from the stripes that are considered in selecting the reference stripe 602. To do so, in one implementation, the disparity propagation approach estimates the width w of the majority of the stripes according to a winner-takes-all scheme. The winner-takes-all scheme is well-known in the art. The winner-takes-all scheme uses a voting strategy to determine the width w. Based on the voting strategy, each edge stripe pixel (e.g., stripe pixels located at the right and left edges of a stripe) casts a vote about the width of its stripe. In one implementation, right edge stripe pixels look at their closest left edge stripe pixels to cast a vote about the width of their local stripes. For example, the right edge stripe pixel 616 looks at the closest left edge stripe pixel 618 to cast a vote about the width of stripe 604. Additional edge stripe pixels in stripe 604 and the other stripes on all raster lines 614 also cast a vote. The winner-takes-all scheme selects the width having the most votes across all stripes to be the width w for the majority of the stripes. The disparity propagation approach excludes the stripes having width greater than twice the width w from the stripes that are considered in selecting the reference stripe 602 because these stripe are likely created by shadows and occlusion.

Features of the object (e.g., the face of FIG. 3A) that is being photographed may cause additional stripes to appear in images captured in each of the stereo pairs 101a and 101b. For example, when the object is the human face, eyebrows and facial hairs may cause small stripes to appear among the projected striped pattern. The small stripes may be referred to as noisy data, and they affect the estimation of the width w when an averaging method is used. The averaging method takes the average of the width of all the stripes on all raster lines 614 to calculate the width w. Thus, in the averaging method the width of the noisy data is used in calculating the width w. However, the winner-takes-all scheme attempts to avoid the noisy data by selecting the width w that has the most votes across all stripes. Even though the width of the noisy data may have some votes, it typically will not have as many votes as the width w of the majority of the stripes. As a result, the disparity propagation approach typically also reduces the influence of noisy data.

Figure 7A:
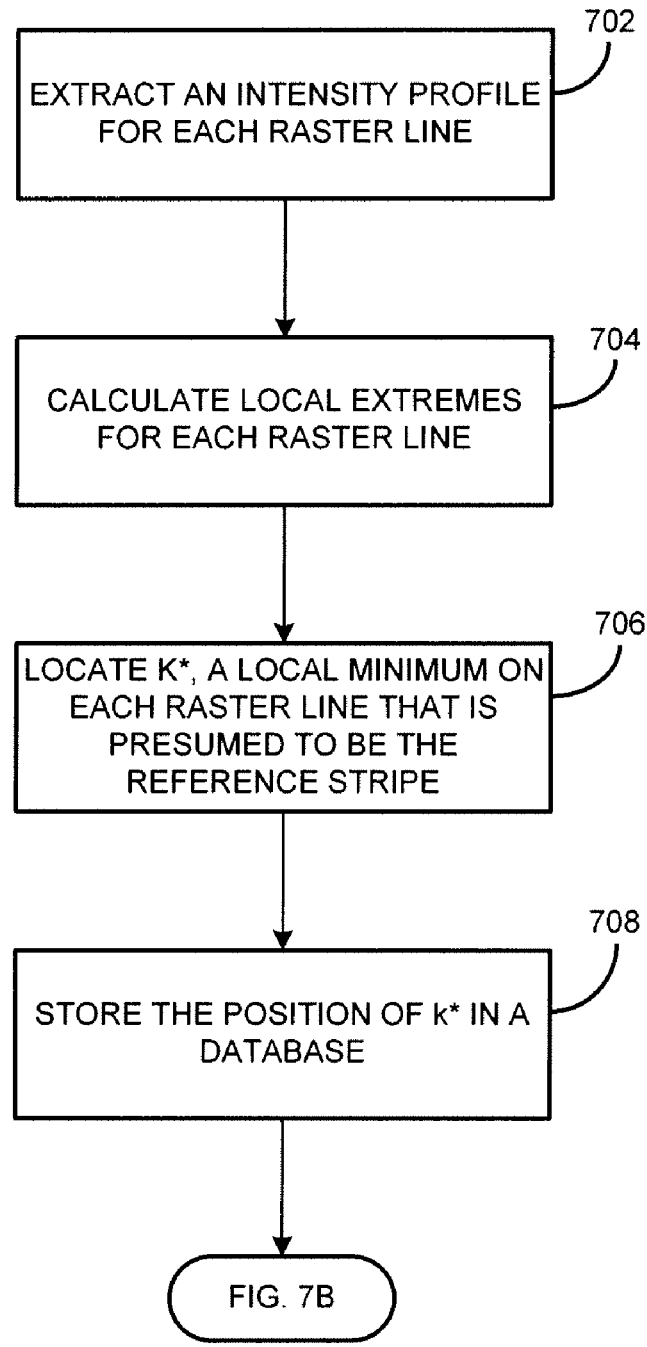
FIGS. 7A-7B illustrate a process for locating initial matched pixels in a pattern that includes a special stripe.
Figure 7B:
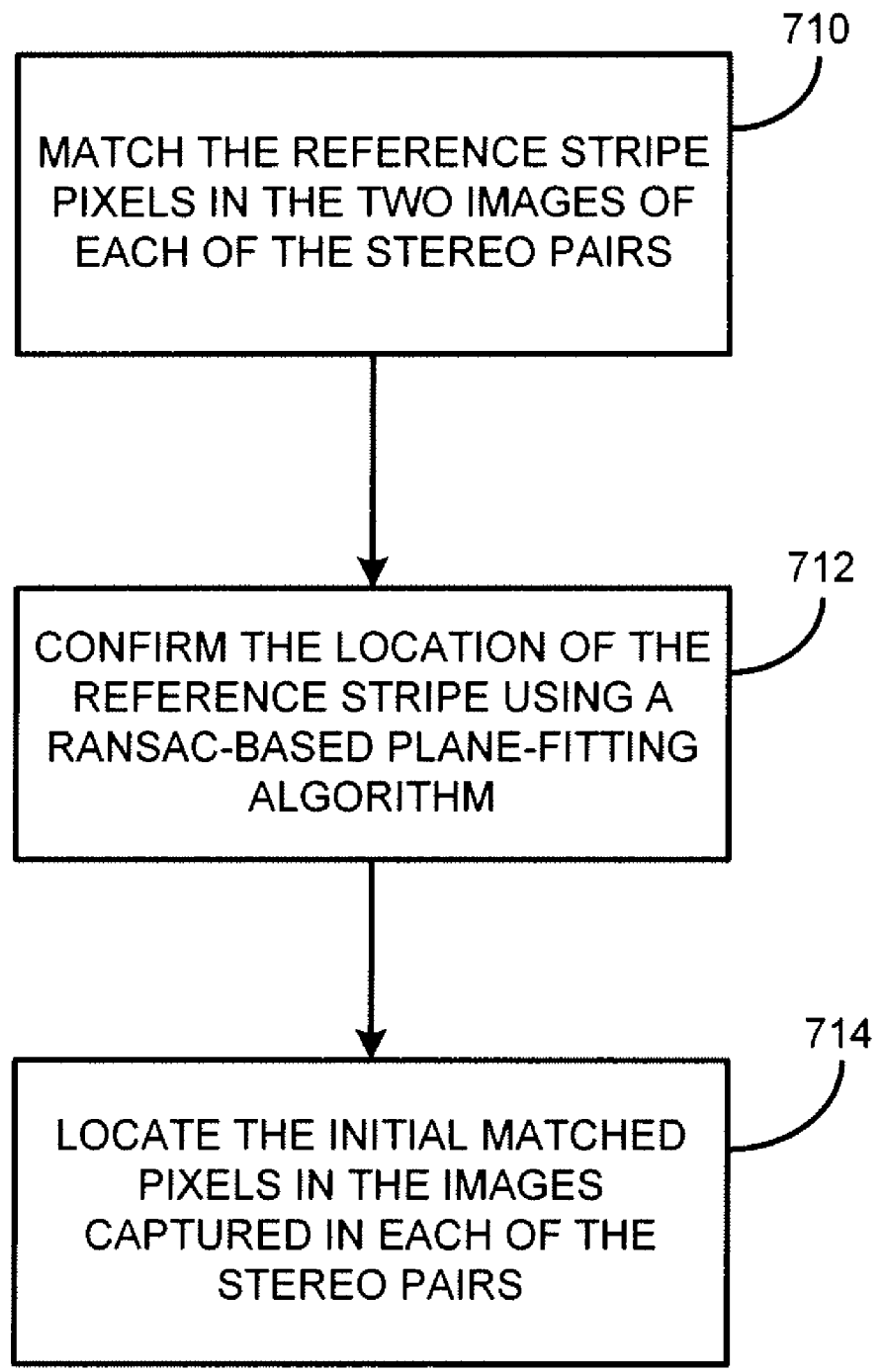
Figure 7C:
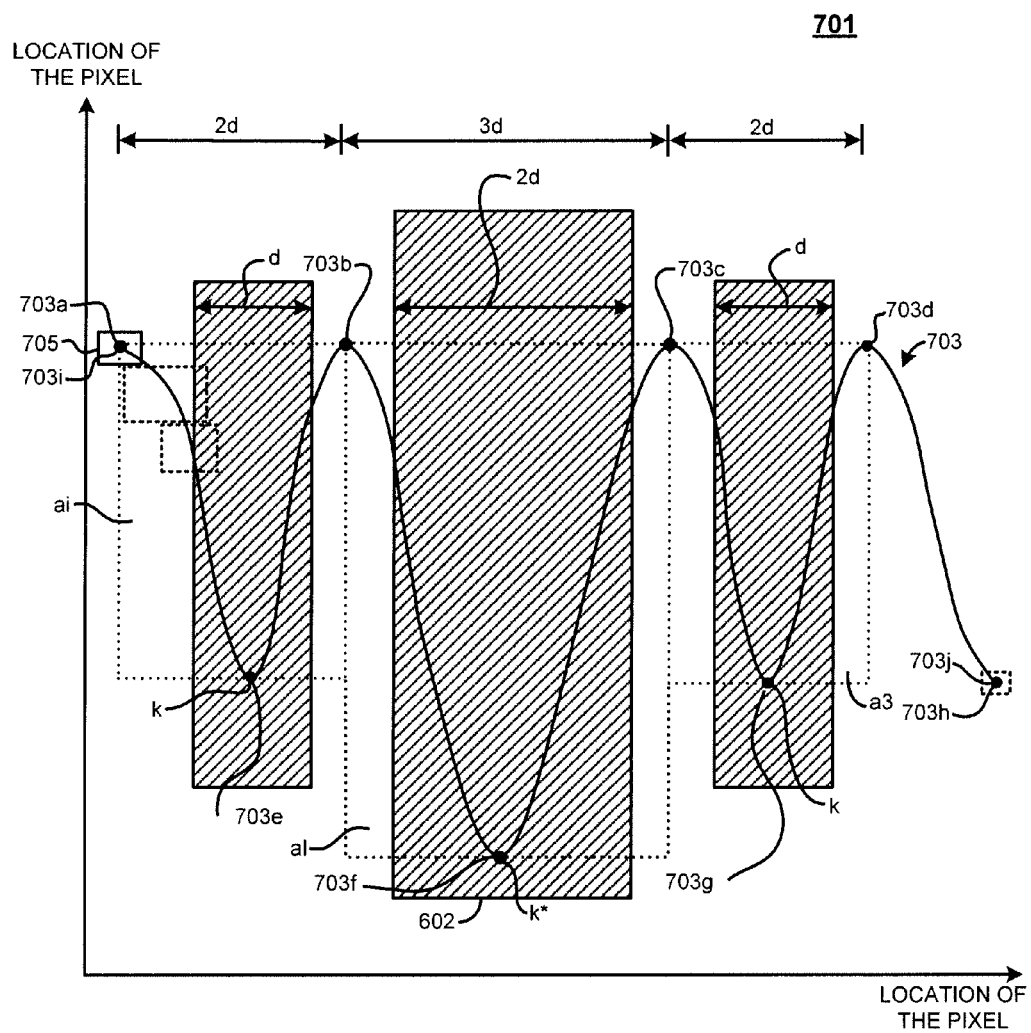
FIG. 7C illustrates an intensity profile that includes a curve representing the intensity values of pixels located on one of the horizontal lines of FIG. 6.

After determining the width w, the reference stripe pixels on the reference stripe 602 are located. FIGS. 7A-7B illustrate a process 700 for locating the reference stripe pixels and finding the initial matched pixels for images captured in each of the stereo pairs 101a and 101b. Process 700 includes extracting an intensity profile for each raster line 614 (702). Referring to FIG. 7C, an intensity profile 701 includes a curve 703 representing the intensity values of the pixels located on one of the raster lines 614. The curve 703 includes local maximums 703a, 703b, 703c, and 703d, local minimums 703e, 703f, 703g, and, 703h, and a search window 705. Process 700 includes calculating local extremes (e.g., local maximums and minimums) of the intensity profile for each raster line 614 (704). To calculate the local maximums, the search window 705 that is 3 pixels wide is used. The search window 705 searches the curve 703 from beginning portion 703i of the curve 703 to ending portion 703j of the curve 703, and each time the intensity of the pixel at the center of the search window 705 is greater than the intensity of its neighboring pixels, the location and the intensity of the center pixel is stored in a local maximum database. In this manner, the positions and intensities of the local maximums 703a, 703b, 703c, and 703d are determined and stored in the local maximum database. Similar to locating the local maximums, the search window 705 searches the curve 703 from the beginning portion 703i of the curve 703 to the ending portion 703j of the curve 703, and each time the intensity of the pixel at the center of the search window 705 is smaller than the intensity of its neighboring pixels, the position and the value of this center pixel is stored in a local minimum database. In this manner, the positions and intensities of the local minimums 703e, 703f, 703g, and 703h are identified.

Process 700 also includes locating k*, a local minimum in the intensity profile on each raster line 614 that is presumed to be on the reference stripe, (706) as follows:

$$k_n^* = \arg_{max}(|X_i - X_j| * |((Int_i + Int_j)/2) - Int_k|) \quad \text{(Equation 1)}$$

where i and j are indices of two neighboring local maximums of the intensity profile, $X_i$ and $X_j$ are positions of the two local maximums, $Int_i$ and $Int_j$ are intensity values at $X_i$ and $X_j$, respectively, k is a local minimum between the local maximums $X_i$ and $X_j$, $Int_k$ is the intensity at the local minimum k, and n is an index of raster lines 614. Equation 1 essentially finds, on each raster line 614 (that is, for each "n"), a pixel on the reference stripe 602. To locate the pixel on the reference stripe 602 for each raster line 614, equation 1 calculates for each local minimum k an area by multiplying a distance between local maximums adjacent to k times the intensity difference between the average of the local maximums and the local minimum. Equation 1 finds the local minimum k* that maximizes this area. k* represent a pixel on the reference stripe because the pixels on the reference stripe produce the largest area since the reference stripe 602 is wider and darker than other stripes. For example, FIG. 7C illustrates that because the reference stripe 602 is 2d wide the distance between the local maximums 703b and 703c is 3d, which is larger than the distance between other adjacent local maximums. In addition, because the reference stripe 602 is darker than other stripes the intensity at k* is lower than intensity at other local minimums.

k* is taken as a candidate reference stripe pixel on each raster line 614. Process 700 also includes storing k* in a database (708). For example, the database may be a vector R={$k_n^*$, n=1, 2 ... N}, which may include k* for each raster line 614, where N is the number of raster lines 614 in images captured in each of the stereo pairs 101a and 101b. The vector R, for example, includes the positions of pixels 626, 628, 630, and 632, which belong to the reference stripe 602. Process 700 is performed for all the images of each of the stereo pairs 101a and 101b. Thus, process 700 produces four vectors $R^{1,L}$, $R^{1,R}$, $R^{2,L}$, and $R^{2,R}$. $R^{1,L}$ and $R^{1,R}$ include sets of candidate reference stripe pixels in the left and right images of the stereo pair 101a, where 1 refers to the stereo pair 101a, L refers to the left image, and R refers to the right image of the stereo pair 101a. $R^{2,L}$ and $R^{2,R}$ include sets of candidate reference stripe pixels in the left and right images of the stereo pair 101b, where 2 refers to the stereo pair 101b, L refers to the left image, and R refers to the right image of the stereo pair 101b.

Process 700 includes matching the reference stripe pixels in the two images of each of the stereo pairs 101a and 101b (710) to remove wrongly located reference stripe pixels. Matching the reference stripe pixels in the two images (710) includes matching the reference stripe pixels in $R^{1,L}$ with corresponding reference stripe pixels in $R^{1,R}$ that have the same raster line 614 position. Every reference stripe pixel in $R^{1,L}$ should have a match in $R^{1,R}$. For every such match a matching score is calculated for a reference stripe pixel in $R^{1,L}$ and its corresponding pixel in $R^{1,R}$ using a matching score function to evaluate the quality of the matched pixels, as described below in more detail with respect to FIG. 8. The matching score is also measured for the neighboring pixels (e.g., ±3 pixels) of the current pixels identified as a match. The pixels producing the highest matching score (e.g., pixels having highest similarities to the reference stripe pixels in $R^{1,L}$) are taken as an actual match for the reference stripe pixels in $R^{1,L}$. Thus, in one implementation, seven matching scores are calculated to determine the best match for a given reference stripe pixel. The seven include one matching score for the corresponding reference stripe pixel in $R^{1,R}$ and six matching scores for the pixels ±3 pixels on each side of the corresponding reference stripe pixel.

Similarly, matching the reference stripe pixels in the two images (710) includes matching the reference stripe pixels in $R^{2,L}$ with the corresponding reference stripe pixels in $R^{2,R}$ that have the same raster line position. For every such match, a matching score is calculated to determine the quality of the matched pixels, as described below in more detail with respect to FIG. 8. As noted above, the matching score is also measured for the neighboring pixels (e.g., ±3 pixels) of the current pixels identified as a match. The pixels producing the highest matching score (e.g., pixels having highest similarities to the reference stripe pixels in $R^{2,L}$) are taken as an actual match for the reference stripe pixels in $R^{2,L}$. Thus, in one implementation, seven matching scores are calculated to determine the best match for a given reference stripe pixel. The seven include one matching score for the corresponding reference stripe pixel in $R^{2,R}$ and six matching scores for the pixels ±3 pixels on each side of the corresponding reference stripe pixel.

Figure 3B:
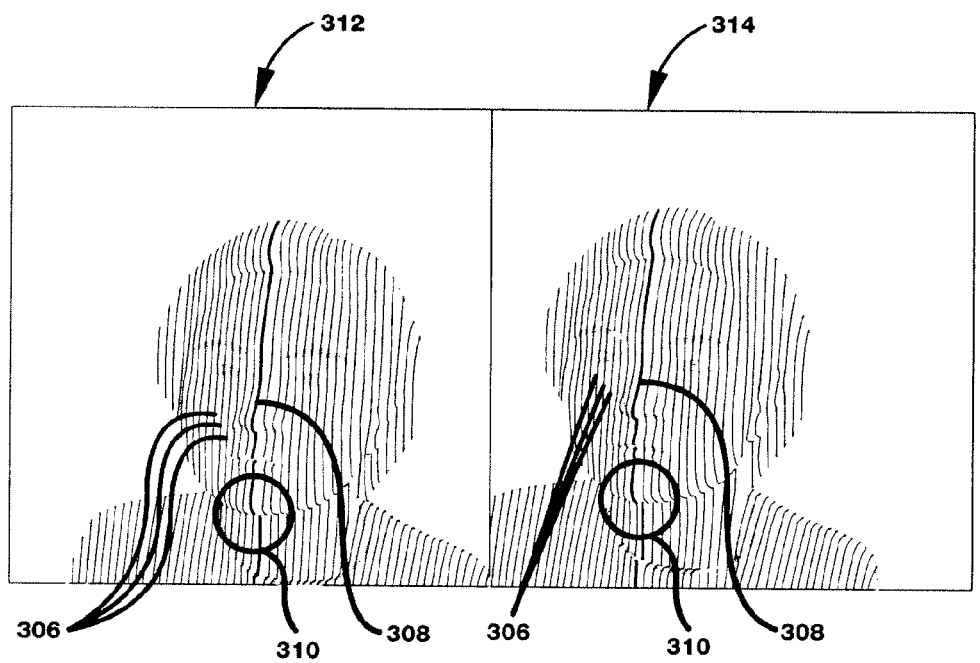
FIG. 3B illustrates a third image and a fourth image including patterns captured in a second stereo pair.

The operation (710) removes wrongly located reference stripe pixels due to noise and/or shadow caused by the depth discontinuity around the nose area or the chin/neck area of the object (e.g., the face of FIG. 3A). For example, if a reference stripe pixel in $R^{1,L}$ cannot find its match in $R^{1,R}$ then it is likely that the stripe pixel does not belong to the reference stripe 602, and this stripe pixel is removed from $R^{1,L}$. However, if the reference stripe pixel in $R^{1,L}$ is matched with a corresponding reference stripe pixel in $R^{1,R}$ then this is a further indication that the reference stripe pixels belongs to the reference stripe.

Process 700 also includes confirming the location of the reference stripe 602 using a Ransac-based plane-fitting algorithm (712). The Ransac-based plane-fitting algorithm is well-known in the art. As part of confirming the location of the reference stripe 602 (712), three-dimensional points of the matched reference stripe pixels are calculated. The three-dimensional points are calculated using the matched reference stripe pixels and the camera parameters, based on stereo triangulation techniques well-known in the art. This produces three-dimensional points for multiple locations along the reference stripe 602. The reference stripe 602 is a result of a light plane intersecting with the surface of the object (e.g., the face of FIG. 3A). The light plane is formed by a lighting source and a reference vertical line in slide 116. The lighting source projects light on a left edge of the reference vertical line in slide 116 and forms a left edge vertical plane having an orientation that may be described as being planer in the direction of light travel (that is, a vector normal to the plane will be perpendicular to the direction of light travel forming the plane). Similarly, the lighting source projects light on a right edge and a middle of the reference stripe 602 and forms a right edge and a middle vertical planes. The intersection of these planes with the surface of the object (e.g., the face of FIG. 3A) forms corresponding points of the reference stripe 602 in the images captured in each of the stereo pairs 101a and 101b. The three-dimensional points of the matched reference stripe pixels should belong to the middle plane because the matched reference stripe pixels are likely located in the middle of the reference stripe 602. The Ransac-based plane-fitting algorithm ("RPA") is used to find the middle plane parameters (e.g., the normal vector of the middle plane and the position of the middle plane). Operation 712 uses the middle plane parameters to determine the distance of the three-dimensional points to the plane. The three-dimensional points that are too far from the plane are disregarded. That is, the points that are too far from the plane are presumed not to lie on the reference stripe.

After confirming the location of the reference stripe 602 (712), process 700 includes locating the initial matched pixels in the images captured in each of the stereo pairs 101a and 101b (714). In one implementation, locating the initial matched pixels includes (714) identifying the closest edge stripe pixels to the left of the matched reference stripe pixels in the two images. In another implementation, locating the initial matched pixels includes (714) identifying the closest edge stripe pixels to the right of the matched reference stripe pixels in the two images. For example, referring again to FIG. 6, the closest edge stripe pixels to reference strip pixels 626, 628, 630, and 632 are edge stripe pixels 612, 634, 636, and 638. The edge stripe pixels 612, 634, 636, and 638 and their corresponding pixels in the other image are identified as the initial matched pixels.

After locating the initial matched pixels (714), the initial matched pixels are propagated in one or more directions in the images captured in each of the stereo pairs 101a and 101b, as explained below with respect to FIGS. 11-13.

In another implementation, the type of pattern used does not include a special stripe as a reference stripe (e.g., all the stripes have the same width). Therefore, this implementation provides an algorithm to locate the initial matched pixels between images captured in each of the stereo pairs 101a and 101b without taking advantage of the special reference stripe. The initial matched pixels located based on this method do not necessarily belong to the same stripe.

Figure 8:
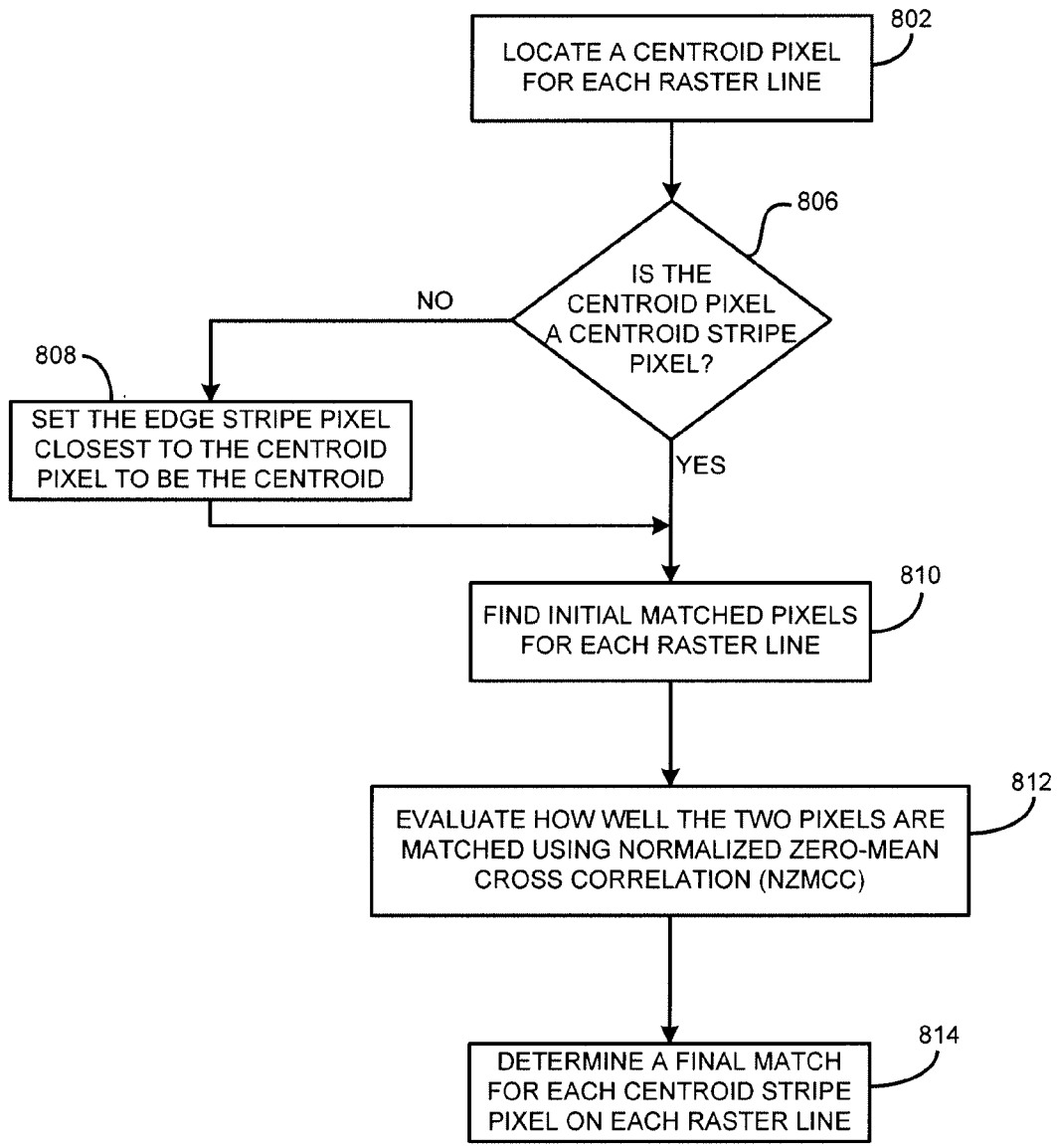
FIG. 8 illustrates a process for locating initial matched pixels in a pattern that does not include a reference stripe.
Figure 9:
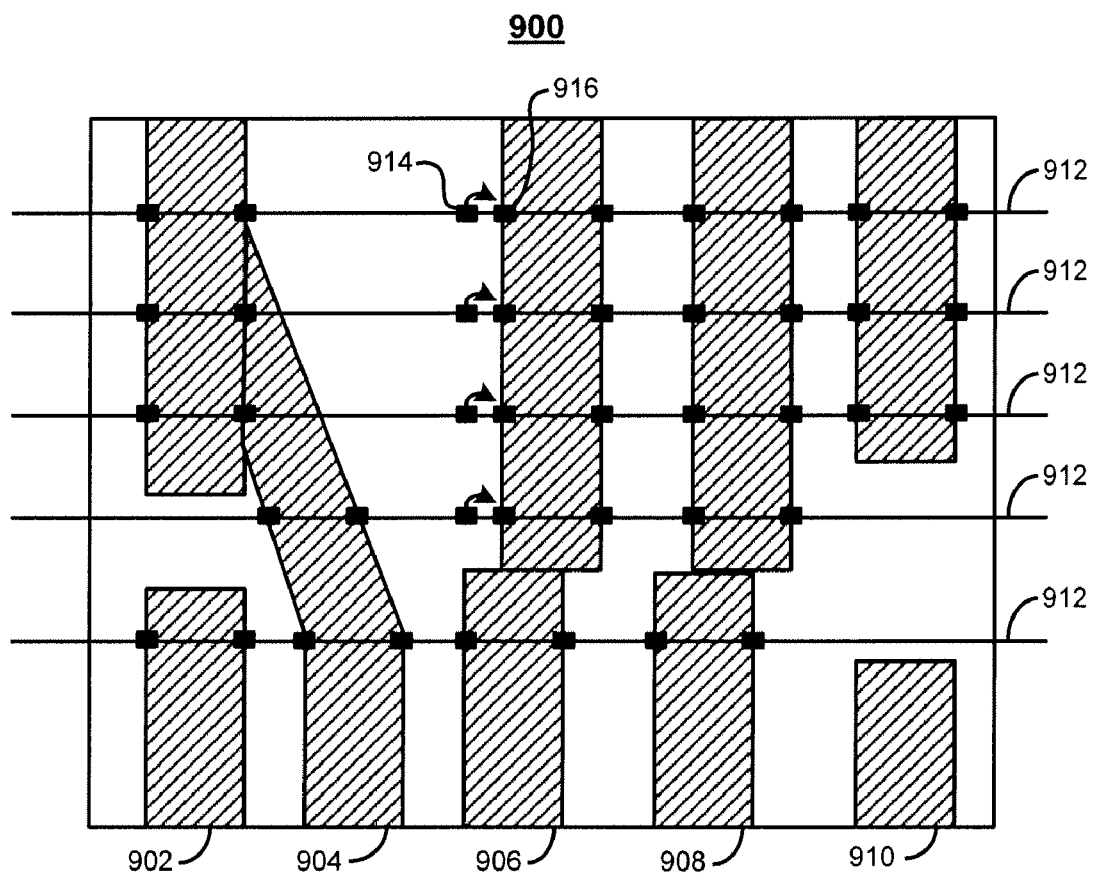
FIG. 9 illustrates a centroid pixel that is not a stripe pixel.

FIG. 8 illustrates a process 800 for locating the initial matched pixels according to an implementation in which all stripes have the same width. Process 800 includes locating a centroid pixel for each raster line 614 (802) in a first-pair image and a second-pair image using an averaging function. The first-pair image includes the first image produced by the stereo camera 102 and the second image produced by the stereo camera 104. The second-pair image includes the third image produced by the stereo camera 108 and the fourth image produced by the stereo camera 110. The centroid pixel is the average of all edge stripe pixels on each raster line 614. Process 800 includes determining whether the centroid pixel is an edge stripe pixel (806), using edge extraction and edge linking as preprocessing operations, which are well-known in the art. If the centroid pixel is not an edge stripe pixel, process 800 includes setting an edge stripe pixel closest to the centroid pixel to be the centroid stripe pixel (806 and 808). For example, a grid 900 includes stripes 902, 904, 906, 908, and 910 and raster lines 912. Grid 900 also includes a centroid pixel 914, which is located on one of the raster lines 912. Because the centroid pixel 914 is not an edge stripe pixel, an edge stripe pixel 916 which is the closest edge stripe pixel to the centroid pixel 914 is set to be the centroid stripe pixel.

Process 800 includes finding initial matched pixels on each raster line 614 (810). As part of finding the initial matched pixels (810), the centroid stripe pixel for each raster line 614 in the first image is matched with a corresponding centroid stripe pixel in the second image. Similarly, the centroid stripe pixel for each raster line 614 in the third image is matched with a corresponding centroid stripe pixel in the fourth image. For example, the same process previously described, of starting with the corresponding position and checking for the best matching score in a search window, may be used.

Figure 10:
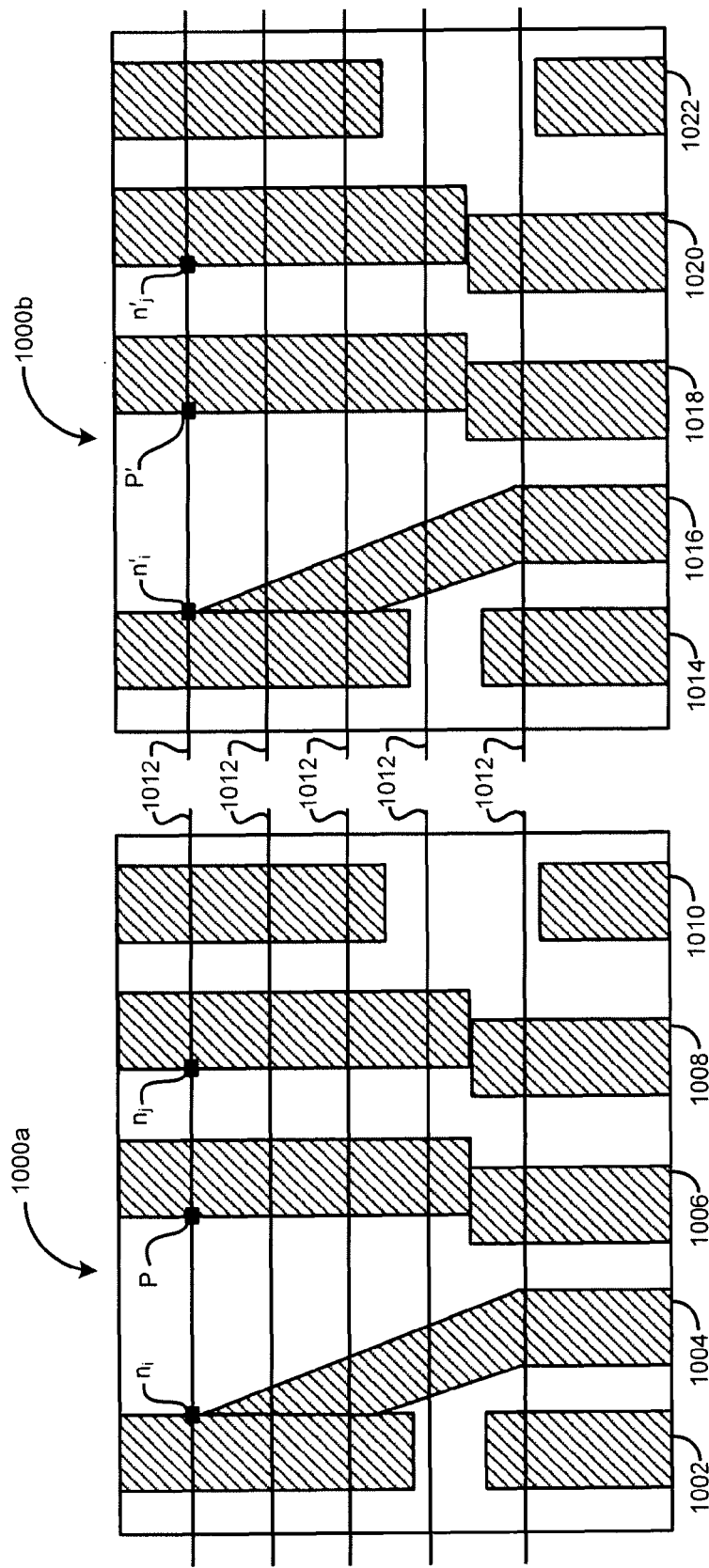
FIG. 10 illustrates a first grid and a second grid including a centroid stripe pixel and a pixel corresponding to the centroid stripe pixel, respectively.

For example, FIG. 10 illustrates grids 1000a and 1000b for the purpose of finding the initial matched pixels in the first image and the second image. Grid 1000a includes stripes 1002, 1004, 1006, and 1008, and 1010 and raster lines 1012. The stripes 1002, 1004, 1006, 1008, and 1010 are the stripes captured in the stereo camera 102. Grid 1000a also includes a centroid stripe pixel p and stripe pixels $n_i$ and $n_j$. The centroid stripe pixel p is located on stripe 1006. The stripe pixels $n_i$ and $n_j$ are located on stripes 1002 and 1008, respectively. Grid 1000b includes stripes 1014, 1016, 1018, 1020, and 1022, and raster lines 1012. The stripes 1014, 1016, 1018, 1020, and 1022 are the stripes captured in the stereo camera 104. Grid 1000b also includes stripe pixels p', $n_i'$, and $n_j'$. The stripe pixel p' is located on stripe 1018. The stripe pixels $n_i'$ and $n_j'$ are located on stripes 1014 and 1020, respectively. As a part of finding the initial matched pixels, the centroid stripe pixel p in the first grid 1000a is matched with the corresponding centroid stripe pixel p' in the second grid 1000b. The pixels p and p' are taken as an initial guess for the initial matched pixels for their raster line 1012.

Process 800 includes evaluating how well the pixels p and p' are matched (812). As part of evaluating the quality of the matched pixels p and p' (812), a normalized zero-mean cross correlation ("NZMCC") in a local window (15×15) is used as a matching score function m(p, p'). NZMCC is well-known in the art. The matching score function m(p, p') illustrated by equation 2 is a linear combination of an intensity matching score function, $m_{int}(p, p')$, and a gradient matching score function $m_{eg}(p, p')$. The intensity matching score function $m_{int}(p, p')$ illustrated by equation 3 determines the similarity between pixels p and p' in an intensity map, which includes the intensities of the pixels. The gradient matching score function $m_{eg}(p, p')$ illustrated by equation 4 determines the similarity between pixels p and p' in a gradient map, which includes the gradient of the pixels' intensities. The matching score function m(p, p') is defined as follows:

$$m(p,p')=am_{eg}(p,p')+(1-\alpha)m_{int}(p,p') \quad \text{(Equation 2)}$$

$$m_{int}(p,p')=\Sigma_\Omega (I(p))-\mu)^*(I'(p')-\mu')/\sigma\sigma' \quad \text{(Equation 3)}$$

$$m_{eg}(p,p')=\Sigma_\Omega (E(p))-\mu_E)^*(E'(p')-\mu'_E)/\sigma_E\sigma'_E \quad \text{(Equation 4)}$$

In Equations 2 to 4, $\Omega$ is a 15×15 neighborhood around pixel p in image I, $\Omega'$ is the corresponding neighborhood around p' in image I'. I(p), I'(p') are the intensity values at p and p' in image I and I', respectively, $(\mu, \sigma)$ and $(\mu', \sigma')$ are the mean and standard deviation in the neighborhood $\Omega$ and $\Omega'$ in I and I', respectively, E(p) and E'(p') are the gradient values at p and p' in the gradient map E and E', respectively, and $(\mu_E, \sigma_E)$ and $(\mu_E, \sigma_E)$ are mean and standard deviation in the gradient map E and E', respectively. $\alpha$ is a weight factor between 0 to 1 and depending on its value, it may emphasize the intensity or the gradient matching score function in equation 2. In one implementation, the value of $\alpha$ is 0.6 to place more weight on the gradient matching score function.

Equation 2 essentially determines the quality of the match between two pixels p and p'. There are several methods for locating an edge stripe pixel p' that produces the best match quality. In one implementation, the matching score function m(p, p') is used to determine the edge stripe pixel p' having the highest similarity to the centroid stripe pixel p. As part of determining the edge stripe pixel p' having the highest similarity, the matching score function m(p, p') is calculated for the centroid stripe pixel p in grid 1000a and all the edge stripe pixels in grid 1000b located on the same raster line as p, and the edge stripe pixel that produces the highest matching score is taken as a match for p. This implementation does not always result in the best match. This implementation may result in an incorrect match because it is possible that the matching score of non-corresponding pixels to be higher than the matching score of corresponding pixels. For example, the matching score m(p, $n_j'$) may be higher than matching score m(p, p'). Thus, in this implementation, $n_j'$ instead of p' may be selected as the best match for p.

In another implementation, a matching-support function M is used to determine a pixel p' having the highest similarity to the centroid stripe pixel p. Equation 5 illustrates one implementation of a matching-support function M that is used to determine whether the neighboring edge stripe pixels ($n_i$ and $n_i'$) and ($n_j$ and $n_j'$) have similar matching scores as the matched pixels p and p':

$$M(p,p')=\Sigma_{i=1}^A m(n_i,n_i')+\Sigma_{j=1}^B m(n_j,n_j') \quad \text{(Equation 5)}$$

In Equation 5, i and j are indices of the stripes on the left and right of p and p', respectively, A is the number of stripes on the left of p and p', and B is the number stripes on the right of p and p'. As part of calculating M(p, p'), the edge stripe pixel, $n_i$, i stripes to the left of p is located. Similarly, the edge stripe pixel, $n_i'$, i stripes to the left of p' is located. $n_i$ and $n_i'$ are likely matched pixels because if p and p' are a good match, then it is reasonable to assume that edge stripe pixel, $n_i$, i stripes to the left of p in grid 1000a is matched with the edge stripe pixel, $n_i'$, i stripes to the left of p' in grid 1000b. The matching score for $n_i$ and $n_i'$ for each stripe to the left of p and p' is calculated and added together.

Similarly, as part of calculating M(p, p'), the edge stripe pixel, $n_j$, j stripes to the left of p is located and the edge stripe pixel, $n_j'$, j stripes to the left of p' is located. $n_j$ and $n_j'$ are likely matched pixels because if p and p' are a good match, then it is reasonable to assume that edge stripe pixel, $n_j$, j stripes to the right of p in grid 1000a is matched with the edge stripe pixel, $n_j'$, j stripes to the right of p' in grid 1000b. The matching score for $n_j$ and $n_j'$ is calculated for each stripe to the right of p and p' and added together. If p and p' are a good match, then matching scores of the neighboring pixels is typically high, resulting in a high matching-support for p and p'. If p and p' are a bad match, matching scores of the neighboring pixels is typically low, resulting in a low matching-support for p and p'.

Process 800 includes determining a final match for the centroid stripe pixel (814). As part of determining the final match (814), a pixel p* that maximizes the matching-support function M is taken as the match for p, where $$p^*=\arg\max_{p'}(M(p,p')) \quad \text{(Equation 6)}$$

The range of p' includes all the stripe pixels in grid 1000b located on the same raster line 1012 as the centroid stripe pixel p. Equation 6 essentially locates a pixel having the highest similarity to p. If the matching score m(p, p*) is higher than the required threshold value, then (p, p*) is taken as an initial matched pixel for the disparity propagation process, as described below in more detail with respect to FIGS. 11-13. In one implementation, the threshold value is 0.8.

The implementation that includes matching-support function M enhances the matching algorithm because it may avoid a situation in which the non-corresponding pixels produce a higher matching score than the corresponding pixels. As described above, it is possible that $n_j'$ results in a higher matching score than the correct match p', which may result in selection of $n_j'$ as a good match for p. Because p and $n_j'$ are a wrongly matched pair, the matching score for their neighboring stripes' edge pixels will typically be low. Thus, the matching-support for p and $n_j'$ will typically be low, indicating p and $n_j'$ are not a good match. As a result, this method is designed to identify mismatches, remove them, and produce a more robust matching result.

Process 800 continues to find the initial matched pixels for each raster line 1012. After finding the initial matched pixels for all the raster lines 1012, process 800 may employ two additional operations to further ensure the correctness and robustness of the initial matched pixels. The two operations include checking local and global supports of the initial matched pixels $s_i$ and $s_i'$. The initial matched pixels $s_i$ and $s_i'$ are a pair of edge stripe pixels and include positions $(x_i, y_i)$ and $(x_i', y_i')$, where x represents a column and y represents a row. As noted above, since the images are rectified the row positions $y_i$ and $y_i'$ are the same. However, the column positions $x_i$ and $x_i'$ are different. The difference between $x_i$ and $x_i'$ is called a disparity.

Checking the local support of the initial matched pixels $s_i$ and $s_i'$ includes determining the disparity of the initial matched pixels $s_i$ and $s_i'$ and comparing it to a disparity of the initial matched pixels $n_k$ and $n_k'$ located on the neighboring raster lines 1012. If the disparity of the initial matched pixels $n_k$ and $n_k'$ is similar to the disparity of the initial matched pixels $s_i$ and $s_i'$, the initial matched pixels $n_k$ and $n_k'$ located on the neighboring raster lines 1012 are counted as a supporter. If the number of supporters in neighborhood of the initial matched pixels $s_i$ and $s_i'$ is fewer than half of the neighborhood size, the initial matched pixels $s_i$ and $s_i'$ are counted as a bad match and are discarded. Checking the local support for the initial matched pixels $s_i$ and $s_i'$ helps to remove mismatches near a depth discontinuity, where the match usually does not have strong support from neighboring matches.

Checking the global support for the initial matched pixels $s_i$ and $s_i'$ includes constructing a histogram of the disparities. The histogram is calculated for the disparities of the initial matched pixels, and the histogram is used to analyze a distribution of the disparities. In the histogram, a good disparity usually exhibits strong support, that is, many of the initial matched pixels have such disparity. While, a bad disparity usually exhibits poor support, that is, only a few of the initial matched pixels share this disparity. Thus, the histogram helps to identify and remove the initial matched pixels having poor support.

Figure 11:
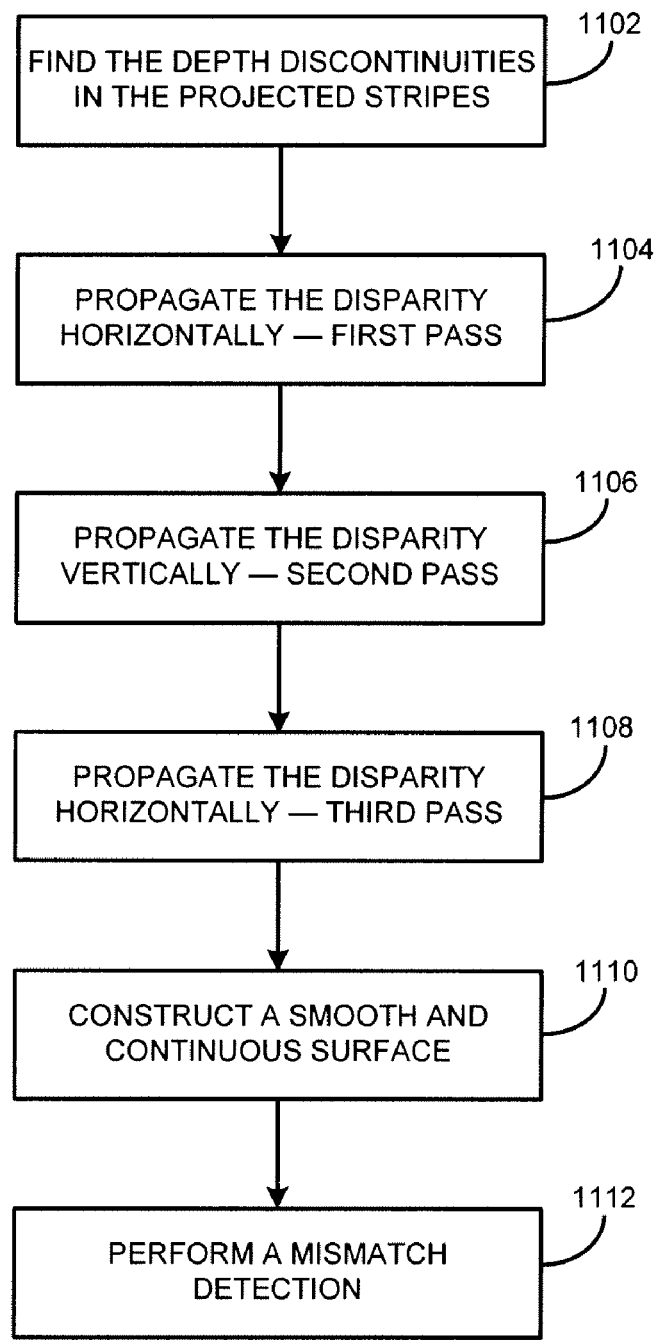
FIG. 11 illustrates a process for propagating disparities in two images.
Figure 12:
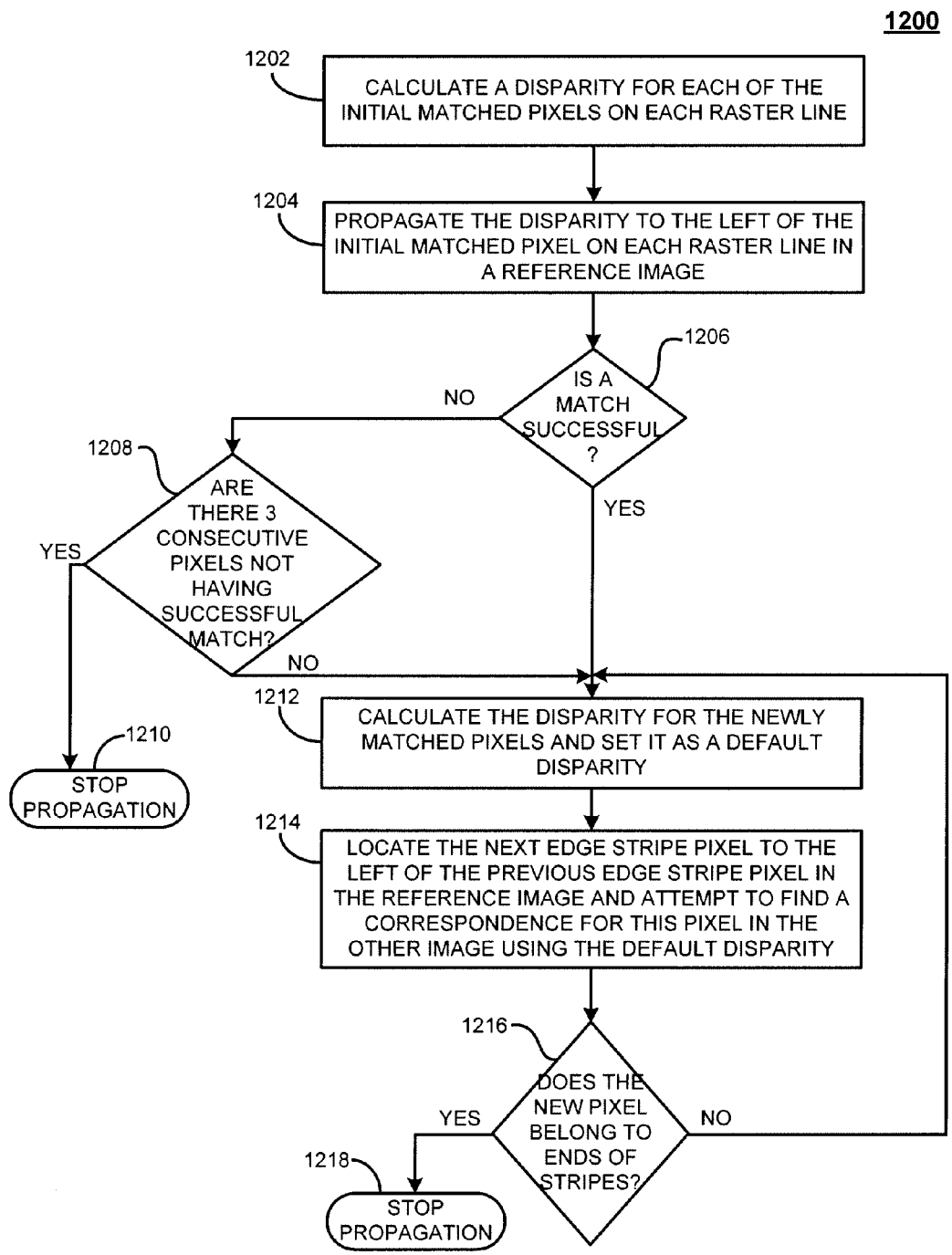
FIG. 12 illustrates a process for propagating disparities in a horizontal direction.
Figure 13:
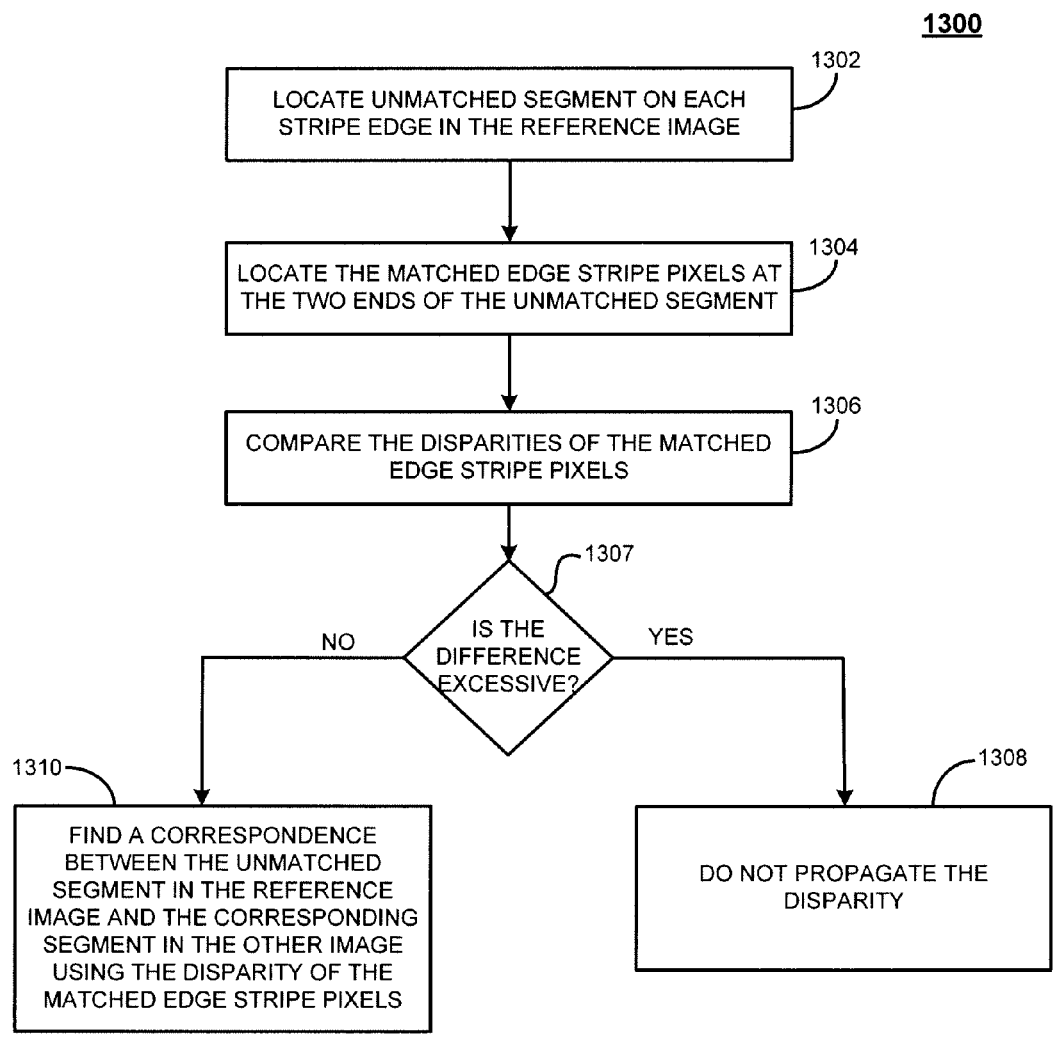
FIG. 13 illustrates a process for propagating disparities in a vertical direction.

After finding the initial matched pixels based on one of the above methods, the disparity of each of the initial matched pixels is propagated in one or more directions as explained with respect to FIGS. 11-13. Referring again to FIGS. 3A-3B, the disparity propagation is used to establish a correspondence between additional edge stripe pixels in the first image 302 and corresponding edge stripe pixels in the second image 304. Similarly, the disparity propagation is used to establish a correspondence between additional edge stripe pixels in the third image 312 and corresponding edge stripe pixels in the fourth image 314.

FIG. 11 illustrates a process 1100 for disparity propagation in one or more directions in the images 302, 304, 312, and 314. The process 1100 includes identifying the depth discontinuities in the projected stripes (1102). As part of identifying the depth discontinuities (1102), explicit and implicit ending parts on each stripe are marked, and when the explicit and implicit ending parts are encountered during disparity propagation, the disparity propagation routine is halted in a given direction. Referring again to FIG. 4, the explicit ending parts include the stripe ends 416 of stripe 406 and areas 414 and 412 of stripes 404 and 402, respectively. As noted above, the stripe ends 416 indicate the existence of the depth discontinuity in the object over which the pattern is projected (e.g., between the jaw and the shoulder of the face of FIG. 3A). The implicit ending parts include pixels on a stripe that are adjacent to an explicit ending part of another stripe. The implicit ending part may result when two stripe segments completely join each other due to depth discontinuity. For example, referring again to FIG. 5, stripe 504 includes a pixel segment 510 which is located adjacent to an explicit ending part 508 of stripe 502. The pixel segment 510 is marked as an implicit ending part, and it stops the disparity propagation because pixels around the pixel segment 510 likely indicate a depth discontinuity. Accordingly, by identifying and marking the implicit ending parts, operation 1102 attempts to effectively handle the situation in which two stripes join each other due to the depth discontinuity.

Process 1100 includes three disparity propagation passes for establishing the correspondence between additional pixels in images captured in each of the stereo pairs 101a and 101b (1104, 1106, and 1108). The first pass includes propagating the disparity in a horizontal direction (e.g., across the stripes in both the left and right directions) (1104). The second pass includes propagating the disparity in a vertical direction (e.g., along the stripes in both the up and down directions) (1106). The third pass includes propagating the disparity again in the horizontal direction (e.g., across the stripes in both the left and right directions) (1108).

FIG. 12 illustrates a process 1200 for propagating the disparity in the horizontal direction in the first pass. Process 1200 includes calculating a disparity of each of the initial matched pixels on each raster line 614 (1202). Some raster lines 614 may not have the initial matched pixels due to depth discontinuities.

As described above, because the images are rectified the corresponding pixels in each image have the same raster line position and presumably different column positions. Thus, finding correspondence for the neighboring pixels of the initial matched pixels is made along the raster lines 614 of the initial matched pixels. Process 1200 includes propagating the disparity to the left of an initial matched pixel on each raster line 614 in a reference image (1204). The reference image for the stereo pair 101a may be the first image 302 or the second image 304. The reference image for the stereo pair 101b may be the third image 312 or the fourth image 314. In one implementation, the first image 302 is taken as the reference image for the stereo pair 101a and the third image 312 is taken as the reference image for the stereo pair 101b. Referring again to FIG. 6, as part of propagating the disparity to the left (1204), the edge stripe pixel 616 to the left of an initial matched pixel 612 is located in the reference image. Propagating the disparity to the left (1204) also establishes a correspondence between the edge stripe pixel 616 in the reference image and a corresponding pixel in the other image. To establish a correspondence between the edge stripe pixel 616 in the reference image and the corresponding pixel in the other image, the disparity of the initial matched pixel 612 calculated in operation 1202 is used. The disparity of the initial matched pixel 612 provides an initial guess for the position of the corresponding pixel in the other image. Thus, pixel 616' (not shown) having such position is taken as an initial match for the edge stripe pixel 616. The matching score for the matched pixels (616, 616') is determined. In addition, the matching score for stripe pixel 616 and each of several neighboring pixels (e.g., ±3 pixels) of pixel 616' is also determined. The pixel resulting in the highest matching score (e.g., having the highest similarity to the edge stripe pixel 616) is taken as an actual match for the stripe pixel 616. The highest matching score is compared with a threshold and if the highest matching score is above the threshold value, the match is considered a good match (1206). If the matching score is below the threshold value, the match is considered a bad match (1206). If there are three consecutive pixels that fail to find their matches as indicated by the low matching score, the disparity propagation routine will be halted (1208). The matching score may be computed using, for example, NZMCC.

If the match is successful, process 1200 includes calculating a disparity for the newly matched pixels and setting this disparity as a default disparity (1212). Propagating the disparity to the left of the initial matched pixels (1204) also includes locating the next edge stripe pixel 618 to the left of the previous edge stripe pixel 616 on the reference image and establishing a correspondence between the edge stripe pixel 618 in the reference image and a corresponding pixel in the other image (1214). To establish the correspondence between the edge stripe pixel 618 and the corresponding pixel, the new default disparity is used to find a correspondence for stripe pixel 618 in a manner similar to operation 1204. The disparity propagation continues from the newly matched pixel and stops when an edge stripe pixel belongs to the explicit or implicit ends of the stripe (1216 and 1218).

After the disparity propagation to the left of the initial matched pixel is completed, the disparity also propagates to the right side of the initial matched pixel in the same manner. Process 1200 is repeated for each raster line 614. As a result, process 1200 provides a set of matched horizontal bands in images captured in each of the stereo pairs 101a and 101b, in which the matched bands presumably follow the edges of the stripes.

FIG. 13 illustrates a process 1300 for propagating the disparity in the vertical direction in the second pass. From the previous horizontal disparity propagation most of the stripes may have portions of their edges matched. For example, referring again to FIG. 6, the reference stripe 602 includes an unmatched segment N and matched edge stripe pixels 634 and 638. Process 1300 includes locating unmatched segment N in the reference image for every stripe edge in the striped pattern (1302). The unmatched segment N includes ends N1 and N2. Process 1300 includes locating the matched edge stripe pixels 634 located above the end N1 and the matched edge stripe pixel 638 located below the end N2 (1304). Process 1300 includes comparing the disparities of the matched edge stripe pixels 634 and 638 (1306). If the difference between disparities of the matched edge stripe pixels 634 and 638 is above a threshold, the disparities are not propagated along the reference stripe 602 (1307 and 1308), and this segment N is marked as uncertain segment. In one implementation the threshold is 3. If the disparities of the matched pixels is below the threshold (e.g., less than 3), process 1300 includes finding a correspondence between unmatched segment N in the reference image and a corresponding segment in the other image based on the disparities of the matched edge stripe pixels 634 and 638 (1307 and 1310). In one implementation, to find the correspondence between unmatched segments N in two images the propagation is done from the center of the segment N toward two ends N1 and N2. Alternatively, the propagation may be done from top to bottom of the segment N or vice versa. The process 1300 is repeated for the other stripes 604, 606, and 608. In one implementation, process 1300 may begin from the top left of the striped pattern and move to the bottom right of the striped pattern. Alternatively, process 1300 may begin from the top right of the striped pattern and move to the bottom left of the striped pattern. As a result, the unmatched segments N in each of the stripes may be matched with a corresponding segment in the other image.

The third pass can be performed after the previous two iterations of the disparity propagation. The third pass attempts to match unmatched stripe segments, such as those uncertain segments mentioned above with respect to the second pass. The third pass uses the same process (process 1200) as in the first pass. An as-yet unmatched stripe may have a horizontal neighbor that was matched in the second pass, and that newly matched neighbor may provide a disparity value allowing the as-yet unmatched pixel to be matched.

After the three passes, a final match map may be obtained indicating which edge stripe pixels are matched. Through propagation processes 1200 and 1300 the search space for finding a correspondence for each stripe pixel has been small (e.g., ±3 pixels). Thus, the disparity propagation approach reduces computation demand. Without the disparity propagation approach, matching a pixel in the first image with a corresponding pixel in the second image may require a lot larger searching window along raster line 614 in the second image to find the corresponding pixel. This is because most of the pixels along raster line 614 in the second image may need to be evaluated to find a potential match for the pixel in the first image. Thus, the search window for each pixel is typically much larger than the search window in the disparity propagation approach, resulting in a higher computation demand.

Referring again to FIG. 11, the matches that have been established so far are in integer precision. The matched pixels corresponding to an approximately flat surface of the object may have the same integer disparity. In the three-dimensional image these matched pixels appear at the same depth even though they have slightly different depths in the object. Thus, the reconstructed three-dimensional image may not be smooth and continuous because with integer disparity the transition in depths of the object is typically only shown between matched pixels having considerable depth difference. This may produce a stair-stepped reconstruction. In order to construct a smooth and continuous surface (1110), process 1100 includes, in one implementation, further refining the matches into sub-pixel precision. The sub-pixel precision improves the depth disparity resolution; thus, the matched pixels corresponding to approximately flat surfaces appear at their actual corresponding depths in the reconstructed three-dimensional image. As part of refining the matches into sub-pixel precision, a curve-parabola-fitting method is used. According to the curve-parabola-fitting method, if a pixel (x, y) is matched to (x', y) with matching score $m_0$, then a matching score $m_1$ between (x, y) and (x'−1, y) and a matching score $m_2$ between (x, y) and (x'+1, y) are also computed using equation 2, as described above with respect to FIG. 8. As part of constructing the smooth and continuous surface (1110), a parabola is fitted into the three points (x'−1, $m_1$), (x', $m_0$) and (x'+1, $m_2$), and a maximum m* on the parabola and a corresponding x* are located. The matched pixel (x*, y) is taken as the final match for (x, y). With the sub-pixel precision of the matches, the operation 1110 produces a smooth three-dimensional surface.

In the final match map, there are occasionally some mismatched pixels, which present themselves as spikes on the surface. Process 1100 includes performing a mismatch detection to remove the mismatched pixels (1112). The detection may be based on a three-dimensional mesh, which will be described with respect to FIG. 14. For each matched pixel, neighboring pixels are located and corresponding three-dimensional points for the matched pixel and its neighboring pixels are computed using stereo triangulation techniques. If the distance between the corresponding three-dimensional point of the matched pixel and the corresponding three-dimensional points of its neighboring pixels is larger than a predefined threshold, process 1100 considers the matched pixel as a mismatch. For example, let $q_{i,j}$ (j=1, 2, ... $N_i$) be the neighboring pixels of $p_i$, the pixel in consideration, $Q_{i,j}$ and $P_i$ are the corresponding three-dimensional points. Then, process 1100 determines whether the distance between $P_i$ and $Q_{i,j}$, for each j, is larger than a predefined threshold. If a ratio of the number of large distance neighbors of $P_i$ over the total number of neighbors $P_i$ is large, process 1100 may consider this as a point resulting from a mismatch.

Figure 14:
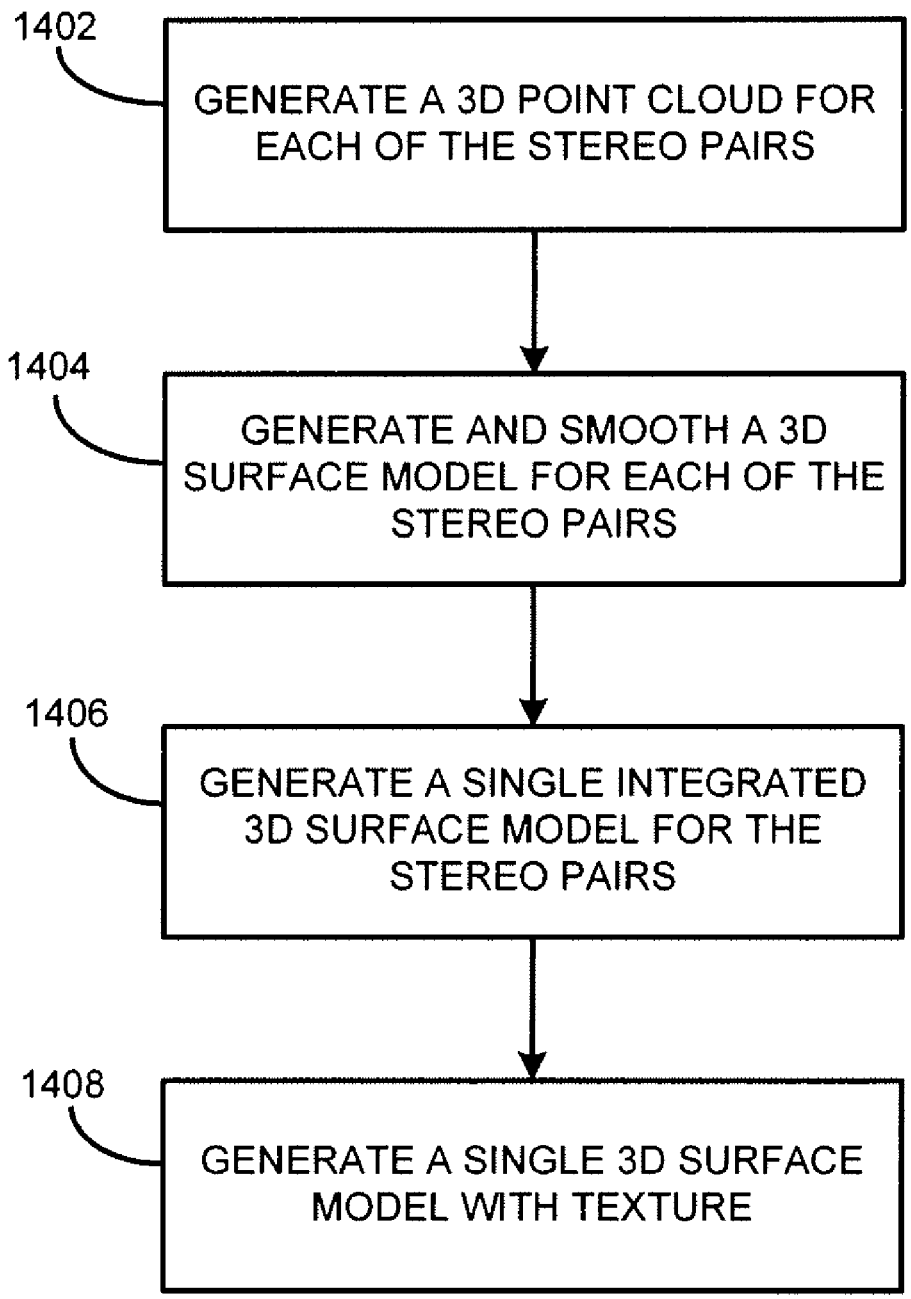
FIG. 14 illustrates a process for generating a single three-dimensional surface model with texture.

FIG. 14 illustrates a process 1400 for generating a single three-dimensional surface model with texture. Process 1400 includes generating a three-dimensional point cloud for each of the stereo pairs 101*a* and 101*b* (1402). Generating the three-dimensional point cloud may use stereo triangulation. The stereo triangulation, which is well-known in the art, uses the disparity of the matched pixels and the camera parameters to compute the three-dimensional point cloud.

Process 1400 includes generating and smoothing a three-dimensional surface model for each of the stereo pairs 101*a* and 101*b* (1404). The three-dimensional surface model is generated for each of the stereo pairs 101*a* and 101*b* using the three-dimensional point cloud, according to known techniques such as three-dimensional meshing.

In one implementation, as part of generating the three-dimensional surface model, a Delaunay triangulation algorithm, which is well-known in the art, is used to build triangulation for the matched pixels in the reference images. The corresponding three-dimensional points then form a three-dimensional mesh.

The three-dimensional point cloud is, in general, noisy due to the stereo matching process as well as numerical error in the stereo triangulation. Moreover, the three-dimensional mesh is, in general, irregular because the matched pixels are extracted from the stripes, which deform when projected onto the surface due to the depth discontinuities. Hence, triangles in the mesh might be very different in shape and size. Thus, one implementation includes building a new three-dimensional surface model (e.g., mesh), which conforms to image grids at a given resolution.

In building the new three-dimensional surface model, a rectangular grid is imposed on the image plane, which is a standard procedure in the art. The new three-dimensional surface model is further processed using Kalman filtering and smoothing. This procedure is well-known in the art. As a result of re-meshing and Kalman filtering and smoothing, a three-dimensional surface model is produced whose corresponding two-dimensional surface model conforms to the image grids and noise is suppressed and the surface is smoothed. When it is necessary, further smoothing may be obtained by fitting a NURB surface into the three-dimensional point cloud obtained in the above process, which is well-known in the art.

Referring again to FIG. 14, operation (1404) produces two three-dimensional surface models (one for each of the stereo pairs 101*a* and 101*b*). Process 1400 uses the two three-dimensional surface models to generate a single integrated three-dimensional surface model for stereo pairs 101*a* and 101*b* (1406).

Referring again to FIG. 2, generating the single integrated three-dimensional surface model (1406) includes registering the first and the second three-dimensional surface models (208). Registering the first and the second three-dimensional surface models is well-known in the art. Registration refers to a procedure of aligning data from the stereo pairs 101*a* and 101*b*, which might have their own coordinate systems, so that the data can be transformed into a single coordinate system. Even when the stereo pairs 101*a* and 101*b* are calibrated using the same reference system, the data obtained by the stereo pairs 101*a* and 101*b* might have discrepancies due to errors in the calibration procedure or in the stereo pairs 101*a* and 101*b* themselves.

Registering the first and the second three-dimensional surface models (208) aligns the first three-dimensional surface model with the second three-dimensional surface model. In one implementation, to align the first and the second three-dimensional surface models, a rigid transformation matrix (R,t) between the first and the second three-dimensional surface models is computed so that, by applying this matrix either to the first or the second three-dimensional surface model, one three-dimensional surface model is aligned with the other three-dimensional surface model.

The computation of the rigid transformation matrix (R,t) may involve two operations. First, an initial transformation matrix is computed, which roughly aligns the two three-dimensional surface models. Second, Iterative Closest Point ("ICP") is used to refine the initial transformation matrix iteratively and finally align the first and the second three-dimensional surface models.

Figure 15:
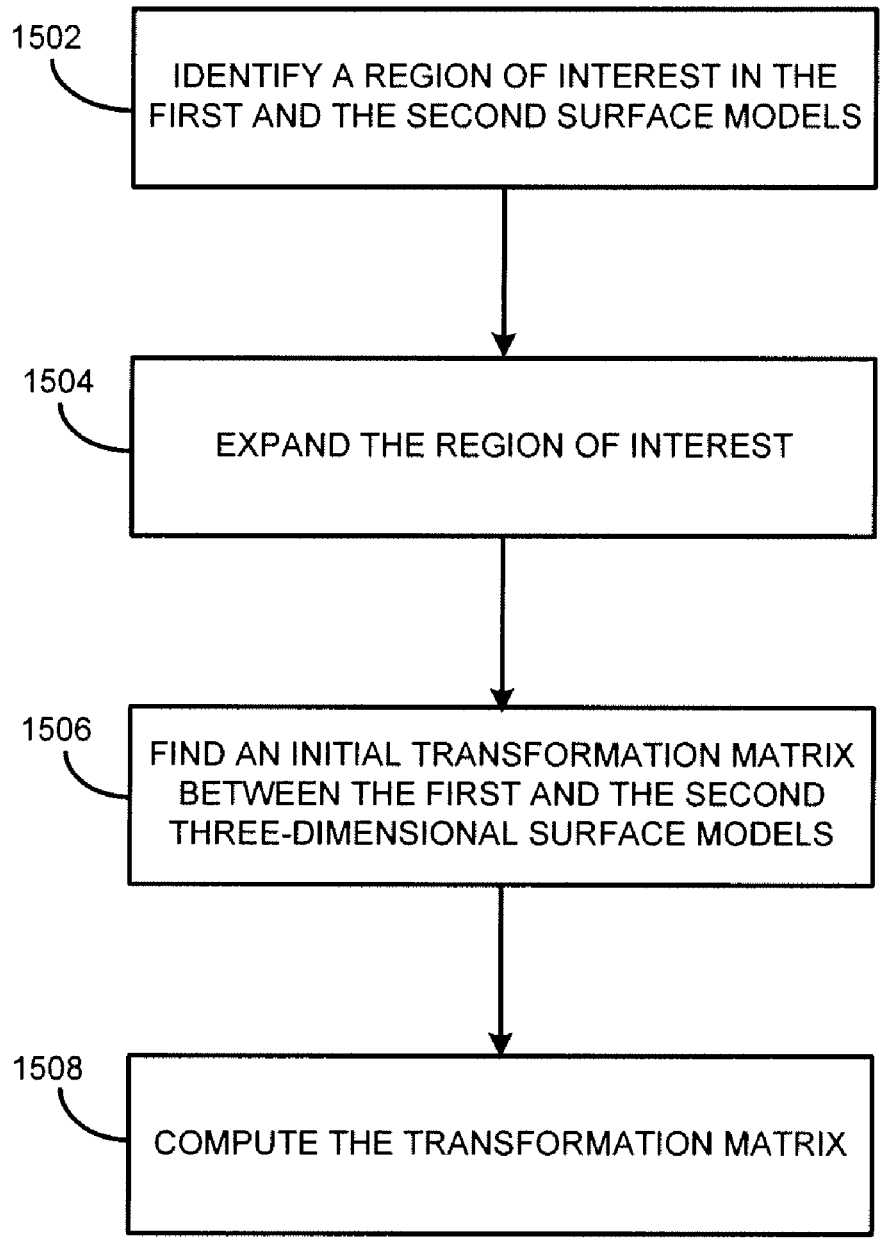
FIG. 15 illustrates a process for computing an initial transformation matrix.

Referring to FIG. 15, a process 1500 may be used for computing the initial transformation matrix. Process 1500 includes identifying a region of interest in the first and the second three-dimensional surface models (1502). Referring again to FIGS. 3A-3B, the images captured in each of the stereo pairs 101*a* and 101*b* do not exactly cover the same physical surface regions because each camera is at a different location. Each image has an overlapping area with the other images, and each image also has an area that is only covered by that image. In FIGS. 3A a-3B, the overlapping area includes a region covering the nose of the person's face. Accordingly, the region covering the nose may be selected as the region of interest in the first and the second three-dimensional surface models. Because triangulation technique is used to create the first and the second three-dimensional surface models, each point in the first and the second three-dimensional surface models is covered by a triangle. The triangle corresponding to the nose, also referred to as a seed triangle, is identified as the triangle falling in the central region and is closest to the cameras.

Process 1700 includes expanding the region of interest (1504). As part of expanding the region of interest, triangles sharing same edges with the seed triangle are located. The expansion continues by taking more triangles sharing edges with those already in the region of interest until the total area of this cluster of triangles reaches a predefined amount. In one implementation the predefined area is 10,000 $mm^2$. As a result, expanding the region of interest produces two regions (1504), which give rough correspondences between the two three-dimensional surface models.

Process 1500 also includes finding an initial transformation matrix between the first and the second three-dimensional surface models (1506). Finding the initial transformation matrix is based on the two regions of interest found above. Let the vertices in the two matched regions be $RG_1=\{p_{1i}, i=1, 2 \ldots n_1\}$ and $RG_2=\{p_{2j}, j=1, 2 \ldots n2\}$, respectively, where $n_1$ and $n_2$ are the number of vertices in the two regions, respectively. $RG_1$ and $RG_2$ are used to compute an initial translation vector $T_0$ and an initial rotation matrix $R_0$. The centroids $C_1$ and $C_2$ of $RG_1$ and $RG_2$ are computed, and $T_0=C_2-C_1$. Next let $M_{1,cov}$ and $M_{2,cov}$ be the covariance matrices of the $RG_1$ and $RG_2$. Then the eigenvectors of these two matrices are used to form the initial rotation matrices $R_1$ and $R_2$, which are the rotation matrices of the two point sets with respect to the global coordinate system. Then, the initial rotation matrix between the $RG_1$ and $RG_2$ is estimated as $R_0 = R_2 * R^{-1}_1$. $R_0$ is the initial rotation matrix between the two point clouds. The initial transformation matrix $M_0$ then comprises of the initial translation vector $T_0$ and the initial rotation vector $R_0$ ($M_0 = \{R_0, T_0\}$).

Then, the ICP algorithm is used, which takes $M_0$ as an initial value and further refines $M_0$ matrix. The output of the ICP finally aligns the two three-dimensional surface models.

Figure 16A:
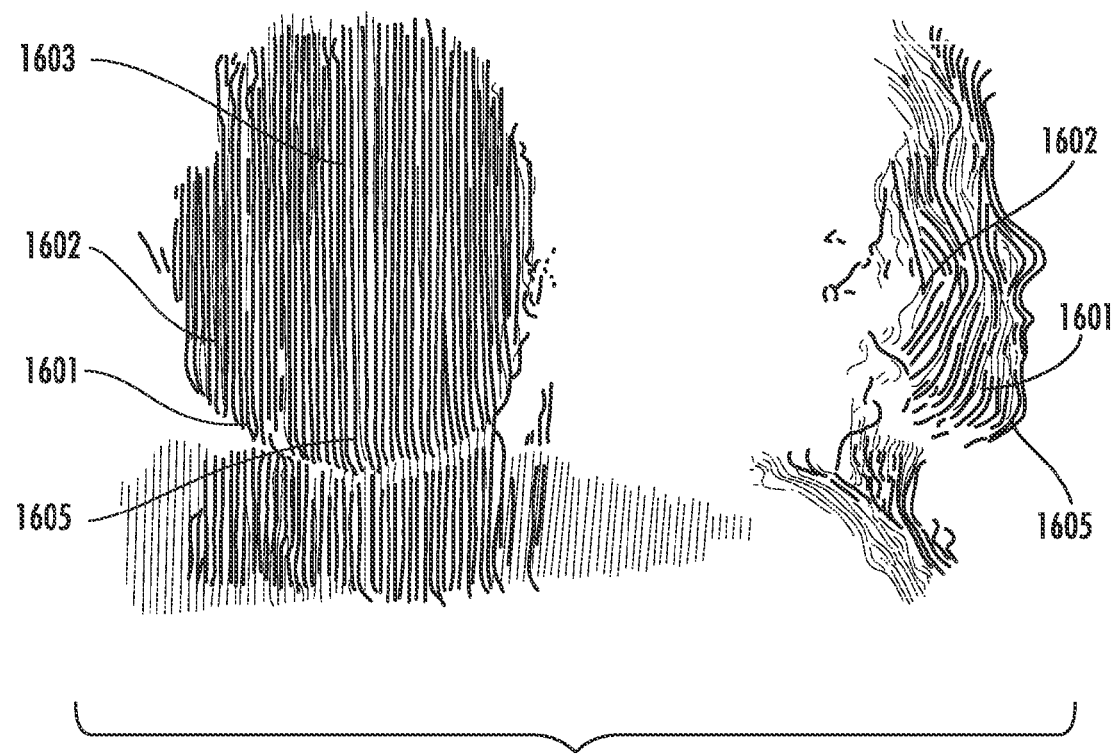
FIGS. 16A-16B illustrate a first three-dimensional surface model and a second three-dimensional surface model before registration.
Figure 16B:
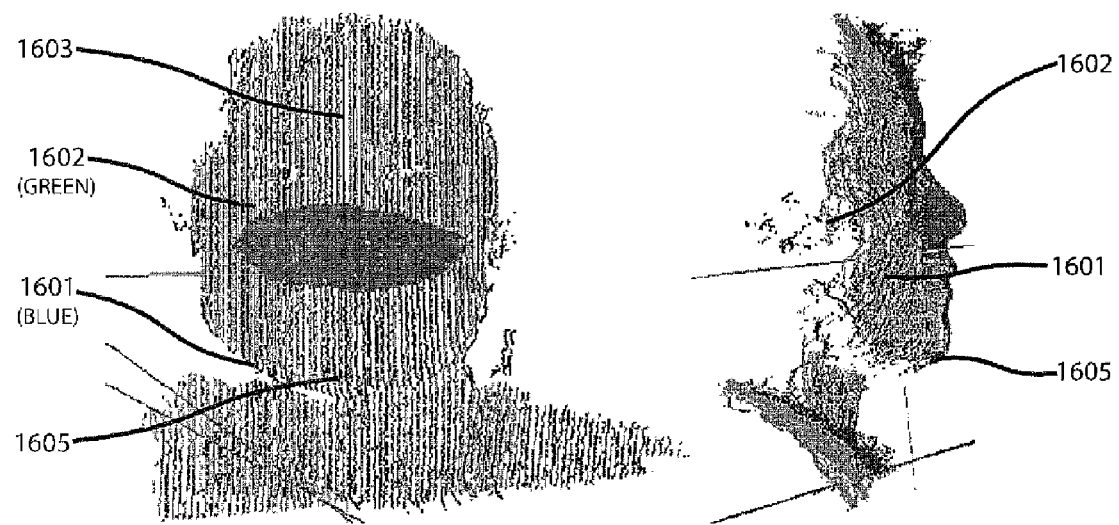

Referring to FIGS. 16A-16B, a first three-dimensional surface model 1601 and a second three-dimensional surface model 1602 are illustrated before registration. Referring to FIG. 16A, the first three-dimensional surface model 1601 and the second three-dimensional surface model 1602 appear in black and white and each include black and white stripes. The first three-dimensional surface model 1601 is shown with lighter gray-scale lines, such as those shown under the "chin" and pointed to by the reference numeral 1601. The second three-dimensional surface model 1602 is shown with darker gray-scale lines, such as those shown on the "jaw" and pointed to by reference numeral 1602. Before the registration, the stripes of the first three-dimensional surface model 1601 and the second three-dimensional surface model 1602 appear in different positions. For example, the reference stripes 1603 of the first and the second three-dimensional surface models appear adjacent to each other rather than in the same position. Thus, the gaps between the stripes are very small, and the striped pattern is not distinctive. Referring to FIG. 16B, the first three-dimensional surface model 1601 appears in a blue color and the second three-dimensional surface model 1602 appears in a yellow color. Before the registration, the yellow stripes appear in between the blue stripes.

Figure 17A:
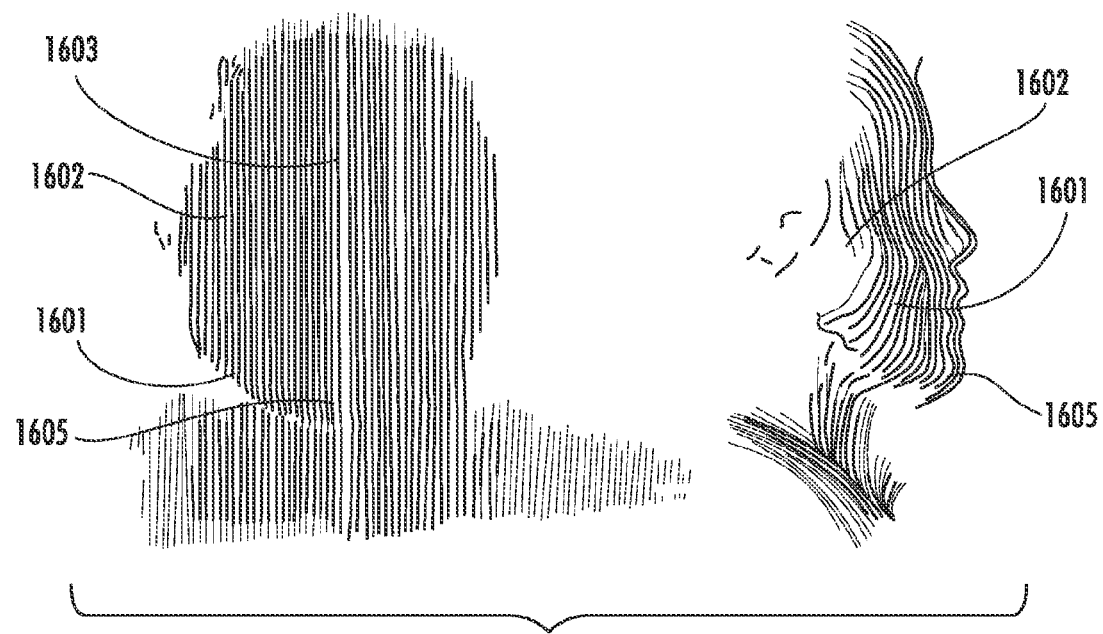
FIGS. 17A-17B illustrate the first and the second three-dimensional surface models of FIGS. 16A-16B after registration.
Figure 17B:
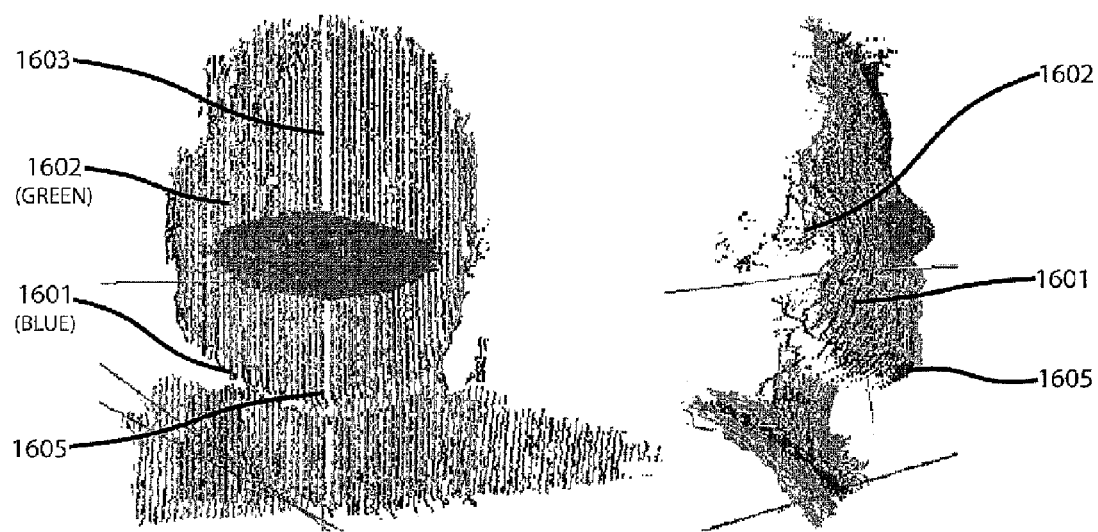

FIGS. 17A-17B illustrate a first three-dimensional surface model 1601 and a second three-dimensional surface model 1602 after registration. Referring to FIG. 17A, the first three-dimensional surface model 1601 and the second three-dimensional surface model 1602 appear in black and white. As described above with respect to FIG. 16A, the first three-dimensional surface model 1601 is shown with lighter gray-scale lines, such as those shown under the "chin" and pointed by the reference numeral 1601. The second three-dimensional surface model 1602 is shown with darker gray-scale lines, such as those shown on the "jaw" and pointed to by reference numeral 1602. As shown, registration aligns the vertical stripes of the first three-dimensional surface model 1601 with the vertical stripes of the second three-dimensional surface model 1602. For example, the reference stripes 1603 in both three-dimensional surface models 1601 and 1602 overlap and form a more distinctive stripe than in FIGS. 16A-B. Thus, the gaps between the stripes are larger in FIGS. 17A-B than the gaps between the stripes shown in FIGS. 16A-B. Referring to FIG. 17B, the first three-dimensional surface model 1601 and the second three-dimensional surface model 1602 appear in color. The first three-dimensional surface model 1601 appears in a blue color and the second three-dimensional surface model 1602 appears in a yellow color. After the registration, the blue and yellow stripes overlap each other creating large openings between the stripes and making the striped pattern more distinctive. For example, the chin area 1605 is better shown in FIGS. 17A-17B than in FIGS. 16A-16B.

Figure 18:
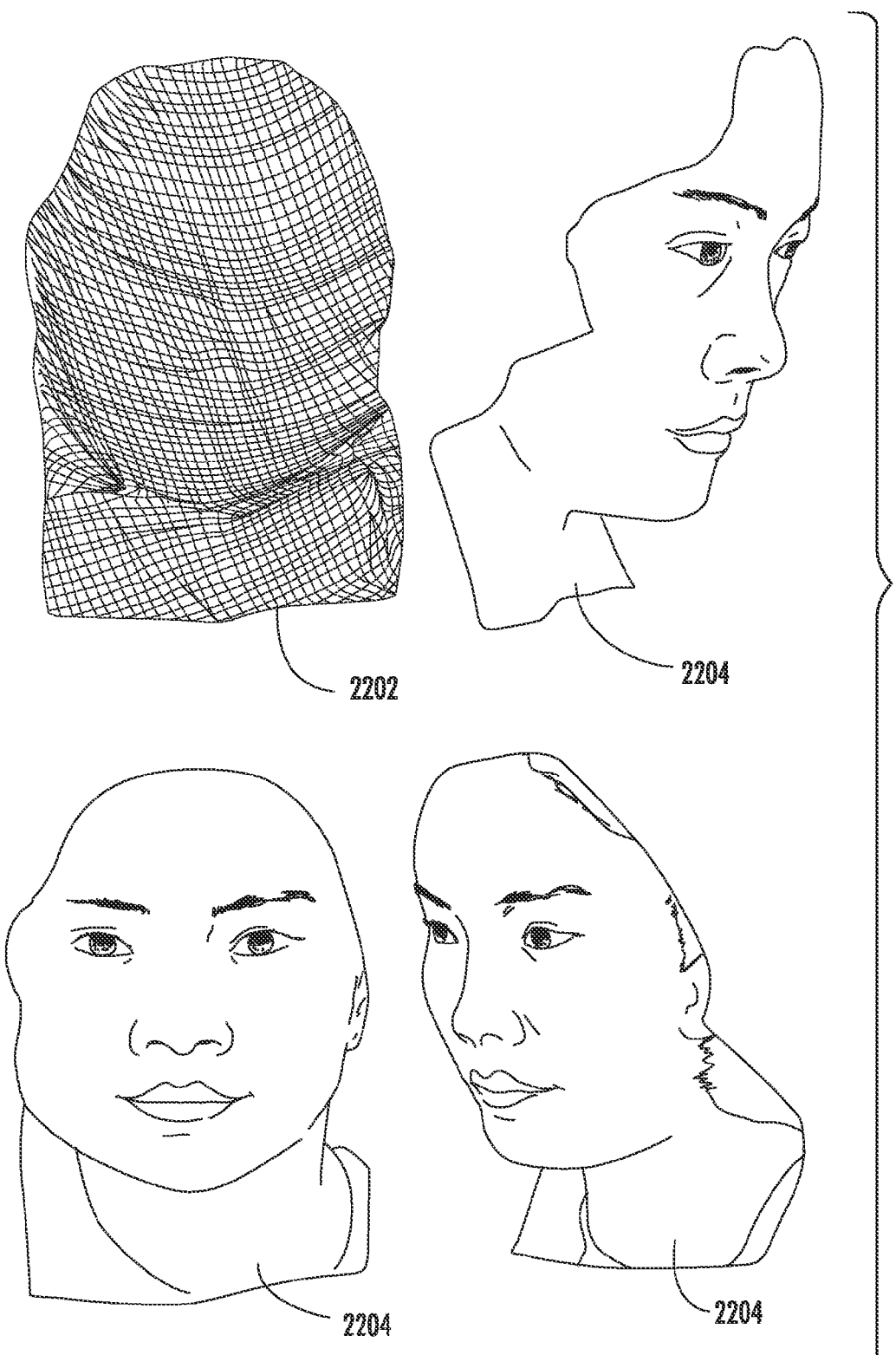
FIG. 18 illustrates a single three-dimensional surface model without texture and a single three-dimensional surface model with texture.

Referring again to FIG. 2, integrating the first and the second three-dimensional surface models (210) combines the registered first and the second three-dimensional surface models and generates a single surface model 2202, as shown in FIG. 18. Integrating the first and the second three-dimensional surface models is well-known in the art.

Referring again to FIG. 2, process 200 includes providing texture to the integrated three-dimensional surface model (212). Providing texture to the integrated three-dimensional surface model is well-known in the art. In one implementation, as part of providing texture to the integrated three-dimensional surface model, the camera parameters, the image from the texture camera 106, and the integrated three-dimensional surface model are used. Because the integrated three-dimensional surface model is in the same coordinate system as the texture camera 106, each of the three-dimensional points in the surface model is simply projected onto the image plane to produce texture coordinates. Thus, providing texture to the integrated three-dimensional surface model (212) produces a single three-dimensional surface with texture (1508). The single three-dimensional surface with texture is provided to users by, for example, rendering (214) or exporting (216) the three-dimensional surface with texture through operations 214 and 216. Referring to FIG. 20, three views of the final textured surface model 2204 are illustrated.

Figure 19:
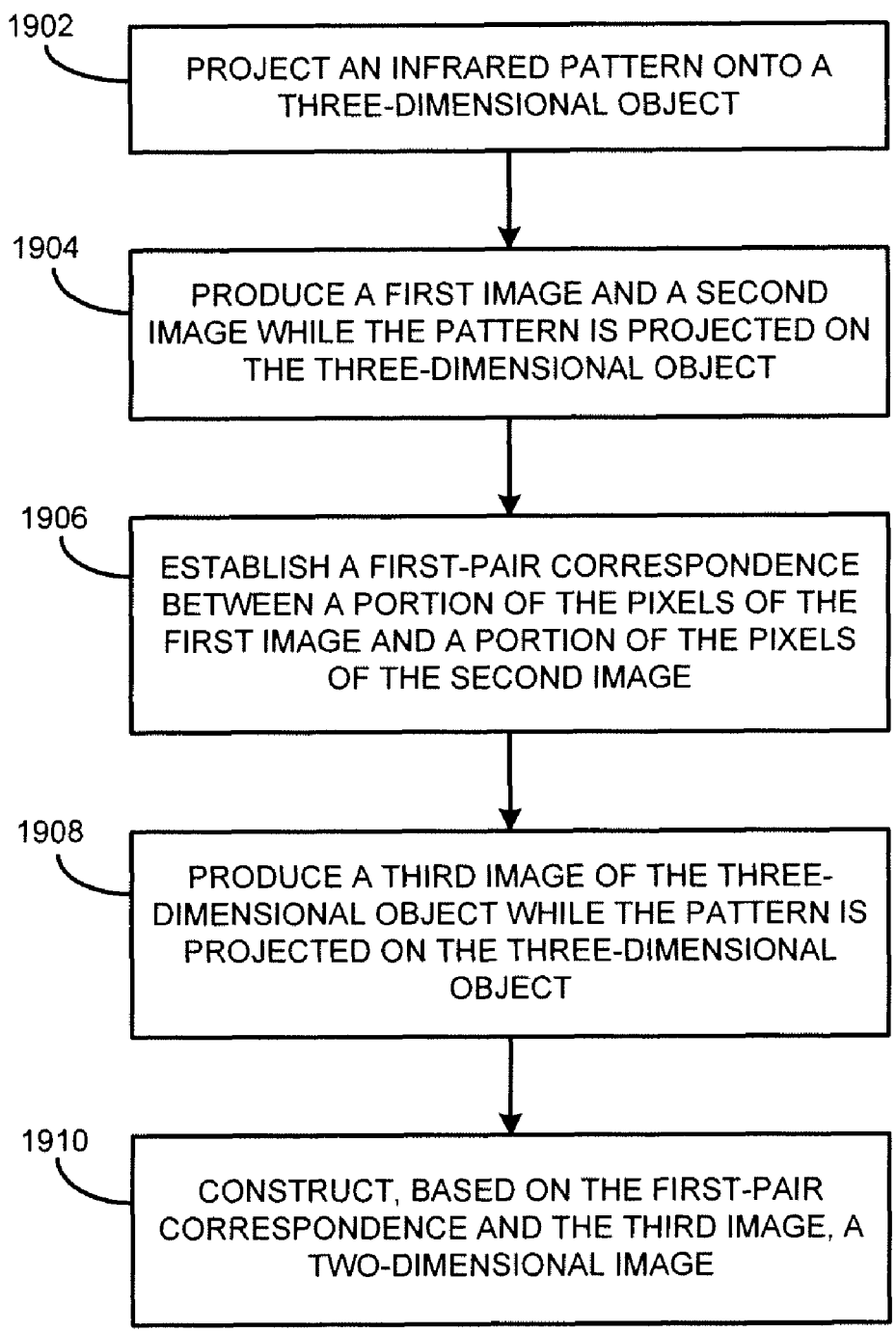
FIG. 19 illustrates a process for reconstructing a three-dimensional image of an object.

Referring to FIG. 19, in another implementation, a process 1900 includes projecting an infrared pattern onto a three-dimensional object (1902) and producing a first image and a second image while the pattern is projected on the three-dimensional object (1904). The first image may be produced by capturing, at camera 102, light filtered through infrared filter 114. The second image may be produced by capturing, at camera 104, light filtered through infrared filter 114. The first image includes the three-dimensional object with the pattern and may be a two-dimensional digital image including pixels. Similarly, the second image includes the three-dimensional object with the pattern and may be a two-dimensional digital image including pixels. Process 1900 includes establishing a first-pair correspondence between a portion of the pixels of the first image and a portion of the pixels of the second image (1906).

Process 1900 includes producing a third image of the three-dimensional object while the pattern is projected on the three-dimensional object (1908). In one implementation, the third image may be a texture image and is produced by capturing non-filtered light at texture camera 106. The texture image includes the three dimensional object, without revealing the infrared pattern, and may be a two-dimensional digital image including pixels. Process 1900 includes constructing a two dimensional image based on the first-pair correspondence and the third image (1910).

Implementations, or features of implementations, may be implemented, at least in part, in a variety of devices. For example, a compact disk (CD), a processing device, or other computer readable medium may contain a program, instructions, or code segments for implementing any of the methods disclosed. Furthermore, a tool may be provided for implementing any of the methods disclosed. The tool may include, for example, a computer-readable medium, a processing device, a camera, a projector, or a combination of these and possibly other components. A processing device may include, for example, a processor, a computer, a programmable logic device, or an integrated circuit.

Implementations also may be implemented using portable devices. Examples include a portable computer or other processing device; a portable telephone; a personal digital assistant; a messaging device such as, for example, a pager or a portable e-mail device (such as, for example, a Blackberry®); a portable music player such as, for example, an iPod®; or another electronic portable messaging, entertainment, organization, or gaming device.

Although the implementations disclosed project a vertical striped pattern onto the three-dimensional object (e.g., the face of FIG. 3A), other patterns may be projected onto the three-dimensional object. For example, a horizontal line pattern, a diagonal line pattern, and/or concentric circles may be projected onto the three-dimensional object.

Finally, various technologies may be used, combined, and modified to produce an implementation, such technologies including, for example, a variety of hardware, software, firmware, integrated components, discrete components, processing devices, memory or storage devices, communication devices, lenses, filters, display devices, and projection devices.

In addition, while the systems and methods disclosed generally have been described in the context of constructing a 3D image of a face, the ability to construct 3D images of other objects is contemplated.

A number of implementations have been described. Nevertheless, it will be understood that various modifications may be made. For example, elements of different systems, processes, and other implementations may be combined, supplemented, modified, rearranged in order, or removed to produce additional implementations. Further, various technologies may be used, combined, and modified to produce an implementation, such technologies including, for example, a variety of hardware, software, firmware, integrated components, discrete components, processing devices, memory or storage devices, communication devices, lenses, filters, display devices, and projection devices. Accordingly, other implementations are within the scope of the following claims.

What is claimed is:

1. A computer program product, tangibly embodied in a machine-readable medium, the computer program product comprising instructions that, when read by a machine, operate to cause data processing apparatus to:
   mark explicit and implicit ending parts on a stripe projected onto an object;
   perform a disparity propagation routine in a horizontal direction, a vertical direction, and the horizontal direction, respectively, further comprising halting the disparity propagation routine in the horizontal or vertical direction based on encountering the explicit or implicit ending parts;
   construct a continuous three dimensional surface based on the performed disparity propagation; and
   perform a mismatch detection using the constructed three dimensional surface if a distance between matched pixels is greater than a predefined threshold.

2. The computer program product of claim 1,
   wherein the explicit ending parts correspond to an end of the stripe or a break in the stripe, and
   wherein the implicit ending parts include a pixel on the stripe adjacent to one of the explicit ending parts of a second stripe, resulting when the stripe and the second stripe join each other due to a depth discontinuity.

3. The computer program product of claim 1, wherein the stripe is projected onto the object using infrared light.

4. The computer program product of claim 1, further comprising instructions that, when read by a machine, operate to cause data processing apparatus to:
   establish a correspondence between an edge stripe pixel in a first image and a corresponding edge stripe pixel in a second image,
   wherein the disparity propagation routine is performed based on establishing the correspondence.

5. The computer program product of claim 1, wherein:
   the object is a user's body; and
   an explicit ending part is marked between a jaw and a shoulder of the user's body.

6. The computer program product of claim 1, wherein performing the disparity routine in the horizontal direction further comprises propagating a disparity along a raster line.

7. The computer program product of claim 1, wherein performing the disparity routine in the horizontal direction further comprises propagating a disparity across the stripe in both left and right directions.

8. The computer program product of claim 1, wherein the disparity routine is performed in the horizontal direction, the vertical direction, and the horizontal direction, respectively.

9. A computer-implemented method comprising:
   marking explicit and implicit ending parts on a stripe projected onto an object;
   performing a disparity propagation routine in a horizontal direction, a vertical direction, and the horizontal direction, respectively, further comprising halting the disparity propagation routine in the horizontal or vertical direction based on encountering the explicit or implicit ending parts;
   constructing a continuous three dimensional surface based on the performed disparity propagation; and
   performing a mismatch detection using the constructed three dimensional surface if a distance between matched pixels is greater than a predefined threshold.

10. A device comprising a processor configured to:
    mark explicit and implicit ending parts on a stripe projected onto an object;
    perform a disparity propagation routine in a horizontal direction, a vertical direction, and the horizontal direction, respectively, further comprising halting the disparity propagation routine in the horizontal or vertical direction based on encountering the explicit or implicit ending parts;
    construct a continuous three dimensional surface based on the performed disparity propagation; and
    perform a mismatch detection using the constructed three dimensional surface if a distance between matched pixels is greater than a predefined threshold.

* * * * *